United States Patent
Moravec et al.

(12)

(10) Patent No.: US 12,478,899 B2
(45) Date of Patent: Nov. 25, 2025

(54) MAINTENANCE OF HYDRODYNAMIC SEPARATORS

(71) Applicant: Donaldson Company, Inc., Bloomington, MN (US)

(72) Inventors: Davis B. Moravec, Burnsville, MN (US); Daryl L Quam, Bloomington, MN (US); Jacob A. Nelson, Bloomington, MN (US); Bradly G. Hauser, Minneapolis, MN (US); Matthew P. Goertz, Bloomington, MN (US); Timothy J. Streed, Eden Prairie, MN (US); Connor J. Colling, Minneapolis, MN (US)

(73) Assignee: Donaldson Company, Inc., Bloomington, MN (US)

( * ) Notice: Subject to any disclaimer, the term of this patent is extended or adjusted under 35 U.S.C. 154(b) by 557 days.

(21) Appl. No.: 17/830,195

(22) Filed: Jun. 1, 2022

(65) Prior Publication Data

US 2022/0395768 A1    Dec. 15, 2022

Related U.S. Application Data

(60) Provisional application No. 63/195,839, filed on Jun. 2, 2021.

(51) Int. Cl.
*B01D 21/00* (2006.01)
*B01D 21/26* (2006.01)
*B01D 21/34* (2006.01)

(52) U.S. Cl.
CPC ......... *B01D 21/34* (2013.01); *B01D 21/0024* (2013.01); *B01D 21/26* (2013.01)

(58) Field of Classification Search
CPC ........... B01D 21/0024; B01L 3/502753; B08B 9/0325
See application file for complete search history.

(56) References Cited

U.S. PATENT DOCUMENTS

| 4,219,411 A | 8/1980 | Molday et al. |
| 5,213,682 A | 5/1993 | Richardson |

(Continued)

FOREIGN PATENT DOCUMENTS

| CN | 105987870 | 10/2016 |
| EP | 0 494 734 | 7/1992 |

(Continued)

OTHER PUBLICATIONS

Amini, et al., "Inertial microfluidic physics", Jan. 1, 2014, Lab on a Chip, 14(15):2739-2761.

(Continued)

*Primary Examiner* — Bradley R Spies
(74) *Attorney, Agent, or Firm* — Mueting Raasch Group

(57) ABSTRACT

Some embodiments of the technology disclosed herein relate to a system having a hydrodynamic separator element defining an element inlet and an element outlet. The element outlet has a first element outlet and a second element outlet. The hydrodynamic separator element has a plurality of curved microfluidic channels in fluid communication. Each of the plurality of microfluidic channels are arranged to operate in parallel. Each microfluidic channel defines a channel inlet downstream of the element inlet and a channel outlet having a first channel outlet upstream of the first element outlet and a second channel outlet upstream of the second element outlet. A flow characteristic sensor is in sensing communication with the separator element. A controller is in data communication with the flow characteristic sensor, where the controller is configured to provide a first alert upon the flow characteristic being outside a first threshold.

17 Claims, 4 Drawing Sheets

(56) References Cited

U.S. PATENT DOCUMENTS

| | | |
|---|---|---|
| 5,349,188 A | 9/1994 | Maggard |
| 5,534,708 A | 7/1996 | Ellinger et al. |
| 5,681,749 A | 10/1997 | Ramamoorthy |
| 5,717,209 A | 2/1998 | Bigman et al. |
| 5,958,237 A | 9/1999 | Cort et al. |
| 6,865,926 B2 | 3/2005 | Obrien et al. |
| 7,214,298 B2 | 5/2007 | Spence et al. |
| 7,575,681 B2 | 8/2009 | Angelescu et al. |
| 7,679,059 B2 | 3/2010 | Zhou |
| 8,186,913 B2 | 5/2012 | Toner et al. |
| 8,208,138 B2 | 6/2012 | Papautsky et al. |
| 8,226,332 B2 | 7/2012 | Kojima et al. |
| 8,276,760 B2 | 10/2012 | Lean et al. |
| 8,405,033 B2 | 3/2013 | Debreczeny |
| 8,426,209 B2 | 4/2013 | Butler et al. |
| 8,461,519 B2 | 6/2013 | Lievois et al. |
| 8,693,762 B2 | 4/2014 | Di Carlo et al. |
| 8,784,012 B2 | 7/2014 | Toner et al. |
| 8,807,879 B2 | 8/2014 | Toner et al. |
| 8,931,644 B2 | 1/2015 | Lean et al. |
| 9,090,865 B2 | 7/2015 | Di Carlo et al. |
| 9,133,499 B2 | 9/2015 | Di Carlo et al. |
| 9,347,595 B2 | 5/2016 | Toner et al. |
| 9,433,880 B2 | 9/2016 | Lean et al. |
| 9,458,489 B2 | 10/2016 | Lim et al. |
| 9,551,651 B2 | 1/2017 | Hegeman et al. |
| 9,644,229 B2 | 5/2017 | Brubacher |
| 9,645,149 B2 | 5/2017 | Nagrath et al. |
| 9,651,501 B2 | 5/2017 | Müller et al. |
| 9,789,485 B2 | 10/2017 | Han et al. |
| 9,797,791 B2 | 10/2017 | Vogt et al. |
| 9,804,068 B2 | 10/2017 | Burke et al. |
| 9,808,803 B2 | 11/2017 | Toner et al. |
| 9,841,331 B2 | 12/2017 | Wood et al. |
| 9,949,679 B2 | 4/2018 | Renlund |
| 9,968,869 B2 | 5/2018 | Volkel et al. |
| 9,987,632 B2 | 6/2018 | Papautsky et al. |
| 10,047,344 B2 | 8/2018 | Poon et al. |
| 10,052,571 B2 | 8/2018 | Lean et al. |
| 10,073,024 B2 | 9/2018 | Nagrath et al. |
| 10,077,462 B2 | 9/2018 | Hou et al. |
| 10,130,946 B2 | 11/2018 | Nagrath et al. |
| 10,144,009 B2 | 12/2018 | Bhagat et al. |
| 10,238,995 B2 | 3/2019 | Volkel et al. |
| 2008/0128331 A1 | 6/2008 | Lean et al. |
| 2008/0213821 A1 | 9/2008 | Liu et al. |
| 2008/0237503 A1 | 10/2008 | Albertson |
| 2009/0014360 A1* | 1/2009 | Toner ............... C12M 23/16 209/208 |
| 2009/0050538 A1 | 2/2009 | Lean et al. |
| 2009/0101822 A1 | 4/2009 | Mitra et al. |
| 2009/0114607 A1 | 5/2009 | Lean et al. |
| 2009/0145392 A1 | 6/2009 | Clark et al. |
| 2009/0283452 A1 | 11/2009 | Lean et al. |
| 2011/0096327 A1 | 4/2011 | Papautsky et al. |
| 2011/0259802 A1 | 10/2011 | Wieczorek et al. |
| 2012/0112072 A1 | 5/2012 | Jones et al. |
| 2012/0152814 A1 | 6/2012 | Lean et al. |
| 2012/0162654 A1 | 6/2012 | Webb et al. |
| 2013/0130226 A1 | 5/2013 | Lim et al. |
| 2013/0210058 A1 | 8/2013 | White et al. |
| 2014/0367349 A1* | 12/2014 | Volkel ............. B01D 21/265 210/512.1 |
| 2015/0276589 A1 | 10/2015 | Wagner et al. |
| 2016/0231223 A1 | 8/2016 | Wang et al. |
| 2017/0205338 A1 | 7/2017 | Coates |
| 2017/0292104 A1 | 10/2017 | Ebrahimi Warkiani et al. |
| 2018/0369817 A1 | 12/2018 | Rezai et al. |
| 2020/0407671 A1 | 12/2020 | Baltekin et al. |
| 2021/0087521 A1 | 3/2021 | Ikeda et al. |
| 2021/0121843 A1 | 4/2021 | Matsuoka et al. |
| 2021/0223154 A1 | 7/2021 | Moravec et al. |
| 2023/0356116 A1 | 11/2023 | Moravec et al. |
| 2023/0390769 A1 | 12/2023 | Nelson et al. |
| 2024/0001263 A1 | 1/2024 | Moravec et al. |

FOREIGN PATENT DOCUMENTS

| | | |
|---|---|---|
| EP | 2 123 361 | 11/2009 |
| EP | 2 777 816 | 12/2019 |
| WO | 2010/111231 | 9/2010 |
| WO | 2011/027099 | 3/2011 |
| WO | 2014/062719 | 4/2014 |
| WO | 2019/232305 | 12/2019 |
| WO | 2021/108692 | 6/2021 |
| WO | 2022/115619 | 6/2022 |
| WO | 2022/256537 | 12/2022 |
| WO | 2023/235396 A1 | 12/2023 |

OTHER PUBLICATIONS

Asghari, et al., "Tape'n roll inertial microfluidics", 2019, Sensors and Actuators A: Physical, 299:111630, 9 pages. Available online Sep. 20, 2019.

Asmolov, "The inertial lift on a spherical particle in a plane Poiseuille flow at large channel Reynolds number," 1999, J Fluid Mech, 381:63-87.

Beech, et al., "Tipping the balance of deterministic lateral displacement devices using dielectrophoresis", 2009, Lab on a Chip, 9:2698-2706. Available online Jun. 15, 2009.

Chen, et al., "Capacitive sensing of droplets for microfluidic devices based on thermocapillary actuation," 2004, Lab Chip 4(5):473-480. Published online Jun. 25, 2004.

Dean, "XVI. Note on the motion of fluid in a curved pipe," The London, Edinburgh, and Dublin Philosophical Magazine and Journal of Science Series 7, 1927, 4(20):208-223, and bibliographic page.

Di Carlo, "Inertial Microfluidics," 2009, Lab Chip, 9(21):3038-3046. Available online Sep. 22, 2009.

Di Carlo, et al., "Continuous inertial focusing, ordering, and separation of particles in microchannels," Nov. 27, 2007, Proc Natl Acad Sci U S A 104(48):18892-18897.

Di Carlo, et al., "Equilibrium Separation and Filtration of Particles Using Differential Inertial Focusing," Mar. 15, 2008, Analytical Chemistry, 80(6):2204-2211.

Dombrovsky, et al., "Spectral properties of diesel fuel droplets," Jan. 2003, Fuel, 82(1):15-22. Available online Jul. 18, 2002.

Dong, et al., "Capacitance Variation Induced by Microfluidic Two-Phase Flow across Insulated Interdigital Electrodes in Lab-On-Chip Devices," Jan. 26, 2015, Sensors 15(2):2694-2708.

Elbuken, et al., "Detection of microdroplet size and speed using capacitive sensors," Sensors and Actuators A: Physical, 2011, 171(2):55-62.

Garstecki, et al., "Formation of droplets and bubbles in a microfluidic T-junction—scaling and mechanism of break-up," 2006, Lab Chip, 6:437-446. Available online Jan. 25, 2006.

Gossett, et al., "Particle Focusing Mechanisms in Curving Confined Flows," Oct. 15, 2009, Analytical Chemistry, 81(20):8459-8465. Available online Sep. 17, 2009.

Guchardi, et al., "Evaluation of a Dual-Beam Near-Infrared Spectrometer Based on Acousto-optic Tunable Filters", Dec. 31, 2001, Applied Spectroscopy, 55(4):454-457.

Holm, et al., "Separation of parasites from human blood using deterministic lateral displacement", 2011, Lab on a Chip, 11:1326-1332.

International Patent Application No. PCT/US2022/031972 filed Jun. 2, 2022, PCT International Search Report and Written Opinion issued Oct. 4, 2022, 17 pages.

Johnston, et al., "Dean flow focusing and separation of small microspheres within a narrow size range," 2014, Microfluidics and Nanofluidics, 17(3):509-518. Published online Jan. 23, 2014.

Kim, et al., "Hydrodynamic Effects on Spectroscopic Water Detection in Gasoline Pipe Flow", Jun. 18, 2014, Energies, 7(6):3810-3822. Available online at https://www.mdpi.com/1996-1073/7/6/3810. Retrieved from the internet on Aug. 9, 2021.

Kuntaegowdanahalli, et al., "Inertial microfluidics for continuous particle separation in spiral microchannels," 2009, Lab Chip, 9(20):2973-2980. Available online Jul. 21, 2009.

(56) References Cited

OTHER PUBLICATIONS

Lancaster, et al. (PARC, Inc.), "Hydrodynamic Separation of Neutrally Buoyant Particles From Wastewater: Reducing Energy Demands and Increasing Energy Yields," Mar. 2015, California Energy Commission. Publication No. CEC-500-2016-025, 96 pages.
Lee, et al., "Inertial focusing of particles with an aerodynamic lens in the atmospheric pressure range", 2003, Journal of Aerosol Science, 34:211-224.
Liu, et al., "Microfluidic CODES: a scalable multiplexed electronic sensor for orthogonal detection of particles in microfluidic channels," 2016, Lab Chip, 16(8):1350-1357.
Murali, "A Microfluidic Coulter Counting Device for Metal Wear Detection in Lubrication Oil," University of Akron, Dec. 2008, 97 pages.
Nivedita, et al., "Dean Flow Dynamics in Low-Aspect Ratio Spiral Microchannels," Mar. 10, 2017, Sci. Rep., 7:44072, 10 pages.
Nivedita, et al., "Use of Secondary Dean Vortices in Spiral Microchannels for Cell Separations," 18th International Conference on Miniaturized Systems for Chemistry and Life Sciences, San Antonio, Texas, USA, Oct. 26-30, 2014, pp. 2483-2485.
Nugen, et al., "PMMA biosensor for nucleic acids with integrated mixer and electrochemical detection", 2009, Biosensors and Bioelectronics, 24:2428-2433. Available online Dec. 25, 2008.
Optek Process Photometry—Sensor Summary, Product Information Sheet, 2006, optek-Danulat, Inc., Germantown, Wisconsin. 2 pages.
Russom, et al., "Differential inertial focusing of particles in curved low-aspect-ratio microchannels", Jul. 31, 2009, New Journal of Physics, 11:075025, 10 pages. Available online at http://www/njp.org/.
Shields IV, et al., "Microfluidic cell sorting: a review of the advances in the separations of cells from debulking to rare cell isolation," 2015, Lab on a Chip, 15:1230-1249. Available online Jan. 6, 2015.
Völkel, et al., "Innovative Technology for Selective Contaminant Removal," 2011, NSTI-Nanotech 2011, 3:581-584.
Wang, et al., "A low-cost, plug-and-play inertial microfluidic helical capillary device for high-throughput flow cytometry," 2017, Biomicrofluidics, 11(1):014107, 11 pages. Available online Jan. 30, 2017.
Warkiani, et al., "Membrane-less microfiltration using inertial microfluidics," Jul. 8, 2015, Scientific Reports, 6:11018., 10 pages.
Wu, et al., "Microfluidic Hydrodynamic Cell Separation: A Review", 2009, Micro and Nanosystems, 1(3):1-12.
Xu, et al., "Detection of Cryptosporidium parvum in buffer and in complex matrix using PEMC sensors at 5 oocysts mL-1," 2010, Analytica Chimica Acta 669:81-86. Available online May 17, 2010.
Yuan, "In-Line Microfluidic Particle Preconcentrator and Detector for Continuous Flow Monitoring" PhD diss., University of Tennessee—Knoxville, Aug. 2014, 140 pages.
Zheng, et al., "The influence of Saffman lift force on nanoparticle concentration distribution near a wall," 2009, Applied Physics Letters, 95(12):124105, 4 pages. Available online Sep. 25, 2009.
Zhou, et al., "Fundamentals of inertial focusing in microchannels," 2013, Lab Chip 13(6):1121-1132.
International Patent Application No. PCT/US2022/031972 filed Jun. 2, 2022, PCT Preliminary Report on Patentability issued Nov. 21, 2023, 13 pages.

* cited by examiner

MAINTENANCE OF HYDRODYNAMIC SEPARATORS

This application claims the benefit of U.S. Provisional Application No. 63/195,839, filed Jun. 2, 2021, the disclosure of which is incorporated by reference herein in its entirety.

TECHNOLOGICAL FIELD

The present disclosure is generally related to hydrodynamic separators. More particularly, the present disclosure is related to testing the efficacy of hydrodynamic separators.

BACKGROUND

Hydrodynamic separators are used in a variety of industries for concentration and/or separation of dispersed particles in fluid streams such as hydrocarbon liquids, beverages, aqueous solutions, and the like. Particles suspended in the fluid may cause problems in system processes (such as, for example, in fuel or hydraulic systems), may generally be undesirable to consumers (for example, pulp in orange juice or impurities in beer or wine), or may be subject to different processing steps than the fluid (such as in sewage treatment).

Hydrodynamic separators generally contain many relatively small separator channels that are operated in parallel. Each separator channel has an inlet and has at least two outlets. The fluid stream is passed through an inlet of each of the separator channels and through the separator channels. The configuration of the separator channels is such that the fluid stream physically separates into at least a first stream that has a relatively high particle concentration and a second stream that has a relatively low particle concentration. The outlets are configured such that a first outlet branch receives the first stream and a second outlet branch receives the second stream.

Principles of microfluidics dictate the efficacy of the hydrodynamic separators. The flow rate, pressure drop, fluid properties, and channel dimensions are all factors that must remain in relative balance for proper operation of the hydrodynamic separator.

SUMMARY

Some embodiments of the technology disclosed herein relate to a system having a hydrodynamic separation element defining an element inlet and an element outlet. The element outlet has a first element outlet branch and a second element outlet branch. The hydrodynamic separation element has a plurality of curved microfluidic channels in fluid communication. The plurality of microfluidic channels are arranged to operate in parallel. Each microfluidic channel defines a channel inlet downstream of the element inlet and a channel outlet having a first channel outlet branch upstream of the first element outlet branch and a second channel outlet branch upstream of the second element outlet branch. A pressure sensor is in sensing communication with the element inlet and the element outlet. The pressure sensor is configured to sense a pressure differential between the element inlet and the element outlet. A controller is in data communication with the pressure sensor, where the controller is configured to provide a first alert upon the pressure differential exceeding a first threshold.

In some such embodiments, the system has a pump in fluid communication with the element inlet and element outlet. Additionally or alternatively, the pump is configured to pump fluid through the element inlet at a constant flow rate. Additionally or alternatively, the controller is configured to calculate a number of microfluidic channels that are blocked and communicate the number of blocked channels to a user. Additionally or alternatively, a flow meter is in fluid communication with the element inlet. Additionally or alternatively, the pressure sensor is configured to sense the pressure differential between the element inlet and a low particle concentrate branch of the element outlet. Additionally or alternatively, the pressure sensor is configured to sense the pressure differential between the element inlet and a high particle concentrate branch of the element outlet. Additionally or alternatively, the system has a pressure-driven flow control in fluid communication with the element inlet. Additionally or alternatively, the controller is configured to provide a first alert upon the pressure differential exceeding a first threshold.

Some embodiments relate to a method where fluid is flowed through an element inlet and an element outlet of a hydrodynamic separation element at a constant flow rate. The separation element has a plurality of microfluidic channels arranged in parallel. A pressure differential is measured between the element inlet and the element outlet. A first alert is provided upon the pressure differential exceeding a first threshold.

In some such embodiments, a number of microfluidic channels that are blocked is calculated and communicated through a user interface. Additionally or alternatively, the flow rate of the flowing fluid is measured with a flow meter. Additionally or alternatively, fluid is flowed through the element inlet and element outlet by pumping the fluid with a pump. Additionally or alternatively, a pressure-driven flow control flows the fluid through the element inlet and element outlet. Additionally or alternatively, measuring the pressure differential includes measuring the pressure at the element inlet and measuring the pressure at a low particle concentrate branch of the element outlet.

Additionally or alternatively, measuring the pressure differential includes measuring the pressure at the element inlet and measuring the pressure at a high particle concentrate branch of the element outlet. Additionally or alternatively, a second alert is provided upon the pressure differential exceeding a second threshold. Additionally or alternatively, a third alert is provided upon the pressure differential exceeding a third threshold. Additionally or alternatively, the first alert provides a notification of a predicted remaining operational time before recommended maintenance. Additionally or alternatively, a channel blockage rate is calculated over an operational time period of the hydrodynamic separation element and the predicted remaining operational time is calculated based on the channel blockage rate.

Some embodiments relate to a system having a hydrodynamic separator element defining an element inlet and an element outlet having a first element outlet and a second element outlet. A plurality of curved microfluidic channels are arranged to operate in parallel, wherein each microfluidic channel defines a channel inlet downstream of the element inlet and a channel outlet. The channel outlet has a first channel outlet upstream of the first element outlet, and a second channel outlet upstream of the second element outlet. A flow characteristic sensor is in sensing communication with the plurality of microfluidic channels, where the flow characteristic sensor is configured to sense a flow characteristic. A controller is in data communication with the flow characteristic sensor. The controller is configured to provide a first output upon the flow characteristic being outside of a first threshold.

In some such embodiments, a flow generator is in fluid communication with the element inlet and element outlet. Additionally or alternatively, the flow generator is configured to generate fluid flow through the element inlet at a constant flow rate. Additionally or alternatively, the controller is configured to calculate a number of microfluidic channels that are blocked and communicate the number of blocked channels to a user. Additionally or alternatively, a flow meter in fluid communication with the element inlet. Additionally or alternatively, the flow characteristic sensor has a pressure sensor in sensing communication with the element inlet and the element outlet, where the flow characteristic is a pressure differential between the element inlet and the element outlet. Additionally or alternatively, the pressure sensor is configured to sense the pressure differential between the element inlet and a low particle concentrate branch of the element outlet, where the low particle concentration branch of the element outlet is the second element outlet. Additionally or alternatively, the pressure sensor is configured to sense the pressure differential between the element inlet and a high particle concentrate branch of the element outlet, wherein the high particle concentration branch of the element outlet is the first element outlet.

Additionally or alternatively, the flow characteristic sensor comprises a flow meter and the flow characteristic is flow rate. Additionally or alternatively, the flow characteristic sensor comprises a particle sensor. Additionally or alternatively, the flow characteristic sensor comprises at least one sensor in the group consisting of: an optical sensor and an electrical property sensor. Additionally or alternatively, the flow characteristic is at least one characteristic in the group consisting of: turbidity, particle count, particle concentration, pH, resistance, conductance, capacitance, and a dielectric property.

Additionally or alternatively, a pressure-driven flow control is in fluid communication with the element inlet. Additionally or alternatively, the first output comprises a first alert providing a user instruction to engage the valve to obstruct the second element outlet. Additionally or alternatively, the controller is configured to provide a second alert upon the flow characteristic exceeding a second threshold. Additionally or alternatively, a valve is in selective obstructive communication with the second element outlet. Additionally or alternatively, the controller is in operative communication with the valve, and the first output results in engagement of the valve to obstruct the second element outlet.

Additionally or alternatively, a first outlet flow path is upstream of the first element outlet, where each first channel outlet extends to the first outlet flow path, and the system further comprises a barrier disposed in the first outlet flow path, wherein the barrier is configured to selectively obstruct a plurality of first channel outlets along the first outlet flow path. Additionally or alternatively, the controller is in operative communication with the flow generator and, upon the flow characteristic being outside of the first threshold, the controller is configured to cause the flow generator to pulse fluid through the hydrodynamic separator element. Additionally or alternatively, the controller is in operative communication with the flow generator and, upon the flow characteristic being outside of the first threshold, the controller is configured to cause the flow generator to temporarily reverse flow direction.

Some embodiments of the technology disclosed herein relate to a method. Fluid is flowed through an element inlet and an element outlet of a hydrodynamic separator element at a constant flow rate, where the separator element has a plurality of microfluidic channels arranged in parallel. A flow characteristic is measured between the element inlet and the element outlet. A first alert is provided upon the flow characteristic being outside of a first threshold.

In some such embodiments, a number of microfluidic channels that are blocked is calculated and the number of blocked channels is communicated through a user interface. Additionally or alternatively, measuring the flow characteristic includes measuring pressure at the element inlet and measuring pressure at the element outlet. Additionally or alternatively, flowing the fluid through the element inlet and element outlet includes pumping the fluid with a pump. Additionally or alternatively, a pressure-driven flow control flows the fluid through the element inlet and element outlet. Additionally or alternatively, measuring the flow characteristic includes measuring pressure at the element inlet and measuring pressure at a low particle concentrate branch of the element outlet.

Additionally or alternatively, measuring the flow characteristic includes measuring the pressure at the element inlet and measuring the pressure at a high particle concentrate branch of the element outlet. Additionally or alternatively, a second alert is provided upon the pressure differential exceeding a second threshold. Additionally or alternatively, a third alert is provided upon the pressure differential exceeding a third threshold. Additionally or alternatively, the first alert provides a notification of a predicted remaining operational time before recommended maintenance. Additionally or alternatively, a channel blockage rate is calculated during an operational time period of the hydrodynamic separator element and calculating the predicted remaining operational time based on the channel blockage rate.

In some embodiments, a system has a hydrodynamic separator element defining an element inlet and an element outlet having a first element outlet and a second element outlet. A plurality of curved microfluidic channels are arranged to operate in parallel. Each microfluidic channel defines a channel inlet downstream of the element inlet, and a channel outlet having a first channel outlet upstream of the first element outlet and a second channel outlet upstream of the second element outlet. An obstruction is in selective obstructive communication with one or more of the microfluidic channels.

In some such embodiments, a first outlet flow path is upstream of the first element outlet and each first channel outlet extends to the first outlet flow path. The obstruction has a barrier disposed in the first outlet flow path, where the barrier is configured to selectively obstruct at least a portion of the plurality of first channel outlets along the first outlet flow path. Additionally or alternatively, the barrier is configured to selectively obstruct a portion of the plurality of first channel outlets while leaving at least one first channel outlet unobstructed. Additionally or alternatively, the barrier is configured to selectively obstruct all of the plurality of first channel outlets simultaneously. Additionally or alternatively, the barrier is a mechanical component slidably disposed in the first outlet flow path, and the barrier has a length greater than the distance between two consecutive channel outlets along the first outlet flow path, whereby the barrier is configured to obstruct at least two consecutive first channel outlets.

Additionally or alternatively, the barrier has a length greater than the distance across at least 10 consecutive first channel outlets along the first outlet flow path. Additionally or alternatively, the barrier has a plurality of valves each in selective obstructive communication a corresponding microfluidic channel. Additionally or alternatively, a flow characteristic sensor is in sensing communication with the element inlet and the element outlet, where the flow characteristic sensor is configured to sense a flow characteristic being outside of a first threshold. Additionally or alternatively, the flow characteristic sensor is a pressure sensor. Additionally or alternatively, the flow characteristic sensor is a flow meter. Additionally or alternatively, the flow characteristic sensor includes a particle sensor. Additionally or alternatively, the flow characteristic sensor comprises at least one sensor in the group consisting of: an optical sensor and an electrical property sensor.

Additionally or alternatively, the flow characteristic is at least one characteristic in the group consisting of: turbidity, particle count, particle concentration, pH, resistance, conductance, capacitance, and a dielectric property. Additionally or alternatively, a controller is in data communication with the flow characteristic sensor, where the controller is configured to provide a first output upon the flow characteristic being outside of a first threshold. Additionally or alternatively, the first output is an alert. Additionally or alternatively, the controller is configured to provide a second alert upon the flow characteristic exceeding a second threshold. Additionally or alternatively, the controller is configured to engage the obstruction. Additionally or alternatively, the obstruction has a valve in selective obstructive communication with the second element outlet. Additionally or alternatively, the obstruction has a valve in selective obstructive communication with the first element outlet.

Some embodiments relate to a system having a hydrodynamic separator element defining an element inlet and an element outlet having a first element outlet and a second element outlet. A second outlet flow path is upstream of the second element outlet. A plurality of curved microfluidic channels are arranged to operate in parallel, wherein each microfluidic channel defines a channel inlet downstream of the element inlet, and a channel outlet having a first channel outlet upstream of the first element outlet and a second channel outlet upstream of the second outlet flow path. A first flow generator is in fluid communication with the plurality of microfluidic channels, where the first flow generator is configured to generate fluid flow at a first flow rate from the element inlet to the element outlet. A maintenance system is in fluid communication with the hydrodynamic separator element, where the maintenance system is configured to modify the fluid flow through the separator element. A controller is in operative communication with the maintenance system, where the controller is configured to selectively engage and disengage the maintenance system.

In some such embodiments, the maintenance system has a valve in selective obstructive communication with the second element outlet, where the controller is in operative communication with the valve. Additionally or alternatively, the maintenance system has the first flow generator, and the controller is configured to modify the fluid flow rate via the first flow generator. Additionally or alternatively, the controller is configured to reverse the fluid flow via the first flow generator. Additionally or alternatively, the controller is configured to pulse the fluid through the hydrodynamic separator element via the first flow generator. Additionally or alternatively, the maintenance system has a second flow generator in fluid communication with the plurality of microfluidic channels, and wherein the controller is in operative communication with the first flow generator and the second flow generator, and the controller is configured to switch between operating the first flow generator and operating the second flow generator.

Additionally or alternatively, the controller is configured to engage the maintenance system on a regular, periodic basis. Additionally or alternatively, the regular, periodic basis is at least once every 48 hours. Additionally or alternatively, a flow characteristic sensor is in sensing communication with the plurality of microfluidic channels, where the flow characteristic sensor is in data communication with the controller and is configured to sense a flow characteristic. The flow controller is configured to receive the flow characteristic and engage the maintenance system when the flow characteristic is outside of a threshold.

Additionally or alternatively, the flow characteristic sensor has a pressure sensor in sensing communication with the element inlet and the element outlet, wherein the flow characteristic is the pressure differential between the element inlet and the element outlet. Additionally or alternatively, the pressure sensor is configured to sense the pressure differential between the element inlet and a low particle concentrate branch of the element outlet, wherein the low particle concentration branch of the element outlet is the second element outlet. Additionally or alternatively, the pressure sensor is configured to sense the pressure differential between the element inlet and a high particle concentrate branch of the element outlet, where the high particle concentration branch of the element outlet is the first element outlet.

Additionally or alternatively, the flow characteristic sensor has a flow meter and the flow characteristic is flow rate. Additionally or alternatively, the flow characteristic sensor comprises a particle sensor. Additionally or alternatively, the flow characteristic sensor has at least one sensor in the group consisting of: an optical sensor and an electrical property sensor. Additionally or alternatively, the flow characteristic is at least one characteristic in the group consisting of: turbidity, particle count, particle concentration, pH, resistance, conductance, capacitance, and a dielectric property. Additionally or alternatively, a pressure-driven flow control is in fluid communication with the element inlet. Additionally or alternatively, the maintenance system is in alternating fluid communication with individual microfluidic channels, and the controller is configured to selectively switch the maintenance system among the individual microfluidic channels.

Additionally or alternatively, a first outlet flow path is upstream of the first element outlet, where each first channel outlet extends to the first outlet flow path, and the maintenance system has a barrier disposed in the first outlet flow path, where the barrier is configured to selectively obstruct a plurality of first channel outlets along the first outlet flow path. Additionally or alternatively, the controller is in operative communication with the flow generator and, upon the flow characteristic being outside of the first threshold, the controller is configured to cause the flow generator to pulse fluid through the hydrodynamic separator element. Additionally or alternatively, the controller is in operative communication with the flow generator and, upon the flow characteristic being outside of the first threshold, the controller is configured to cause the flow generator to temporarily reverse flow direction.

Some embodiments of the technology disclosed herein relate to a method. Fluid flow is generated from an element inlet to an element outlet of a hydrodynamic separator element at a constant flow rate for a first period of time, where the separator element has a plurality of microfluidic channels arranged in parallel. A maintenance operation is performed including modifying the fluid flow through the separator element by a controller for a second period of time. The first period of time is longer than the second period of time.

In some such embodiments modifying the fluid flow includes engaging a valve in selective obstructive communication with the element outlet. Additionally or alternatively, modifying the fluid flow comprises modifying the fluid flow rate through the separator element. Additionally or alternatively, modifying the fluid flow rate includes reversing the fluid flow direction from the element outlet to the element inlet. Additionally or alternatively, modifying the fluid flow includes pulsing the fluid through the hydrodynamic separator element. Additionally or alternatively, the fluid is a first fluid and modifying the fluid flow comprises stopping flow of the first fluid and flowing a second fluid through the plurality of microfluidic channels. Additionally or alternatively, modifying the fluid flow occurs on a regular, periodic basis.

Additionally or alternatively, the regular, periodic basis is at least once every 48 hours. Additionally or alternatively, a flow characteristic is sensed by a flow characteristic sensor that is in sensing communication with the hydrodynamic separator element. The flow characteristic is sent to the controller. Modifying the fluid flow through the separator element is executed when the flow characteristic is outside of a threshold. Additionally or alternatively, modifying the fluid flow alternates among microfluidic channels.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

Figure 1:
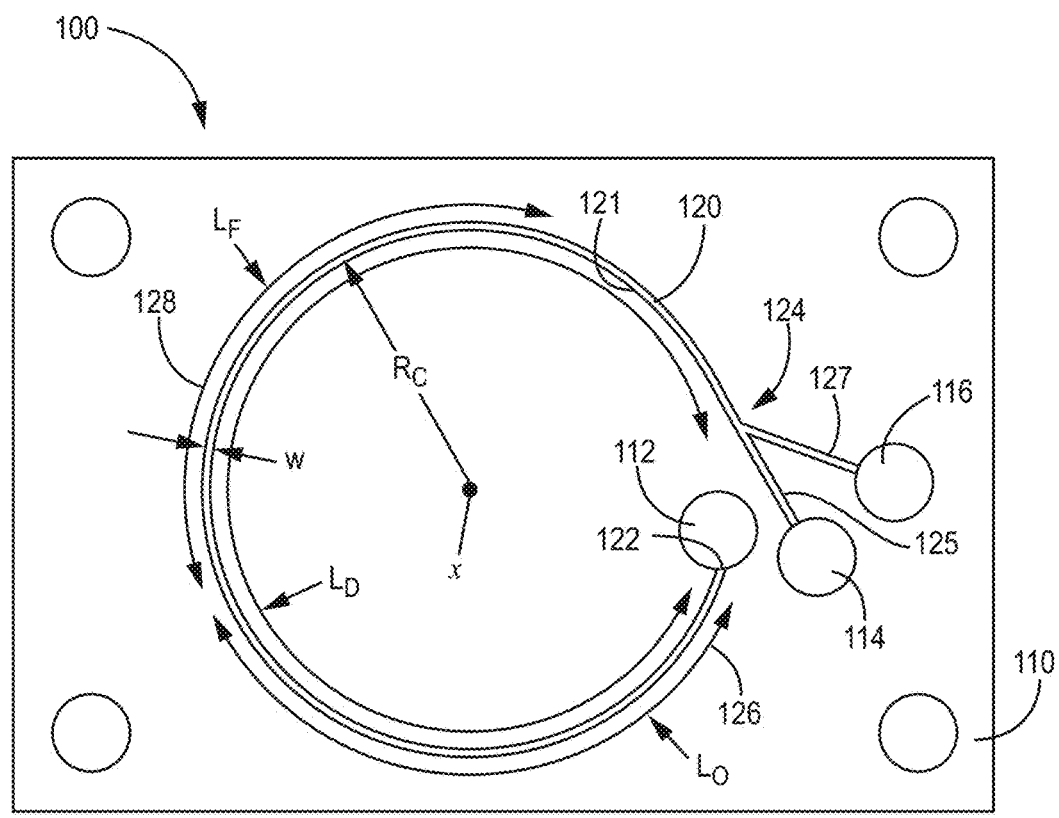
FIG. 1 is a schematic representation of an example microfluidic channel consistent with embodiments.

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

In the following detailed description, reference is made to several specific embodiments. It is to be understood that other embodiments are contemplated and may be made without departing from the scope or spirit of the present disclosure. The following detailed description, therefore, is not to be taken in a limiting sense.

This disclosure provides techniques to focus certain particles in fluid in various fluid systems and to separate those certain particles from the fluid or from particles of other sizes. In general, fluid systems may include particle separator elements, such as hydrodynamic separator elements, to focus particles within a particular size range. The particle separator element may include an inlet and an outlet having at least two flow branches. Particles of the particular size range may be focused into one of the two flow branches. In some embodiments, particles exceeding a threshold size range are focused into one of the two flow branches. Any remaining particles may flow through the at least two flow branches. In some embodiments, the particle separator element may be used to supplement a fluid filter (such as being used as a pre-filter that is positioned upstream of the fluid filter) or replace a fluid filter.

Particle separator elements, which may include hydrodynamic separator elements, may be used as filter replacements or supplements. In particular, particle separator elements may be used to concentrate particles above a critical size into a portion of a fluid flow. This portion of the fluid flow may be removed from the system, thus removing most particles exceeding a threshold size. In some cases, this may replace some or all of the functionality of a filter. In some embodiments, a filter may be used downstream of the particle separator element to remove particles below the threshold size. Further, in some embodiments, the particles focused by the particle separator element are filtered. This may be done at a lower approach velocity than in a system without a particle separator element, and thus lead to possible advantages including for example, a lower filter pressure drop over the life of the filter, which may result in a related lower energy expenditure, a longer filter life, and/or the ability to use smaller filter elements in such systems without a relative increase in pressure drop and/or filter life.

Particle separator elements, which may include hydrodynamic separator elements, may also be used to sort particles of different sizes. In some applications, a threshold size may be determined. The particle separator element may be designed to concentrate particles above the threshold size into a concentrated fluid portion of a fluid flow. The concentrated portion of the fluid flow may be removed from the system. This technique may be used to concentrate particles for particle counting. This technique may also be used to separate different types of particles or to concentrate certain materials for collection.

As used herein, the term "microfluidic channel" refers to a channel having at least one dimension, such as channel width, that is less than 1 millimeter (1000 micrometers). In some embodiments the channel has at least one dimension, such as channel width, that is greater than 1 micron. A microfluidic channel may have a channel width less than 1000 micrometers, a channel height (or depth) less than 1000 micrometers, or both. In some embodiments, for higher flow applications, at least one dimension of the microfluidic channel may be greater than 1 millimeter. In some embodiments, at least one dimension of the microfluidic channel is greater than or equal to 0.5, 1, 2, 3, 4, 5, 6, 7, 8, 9, or 10 millimeters or less than or equal to 10, 9, 8, 7, 6, 5, 4, 3, 2 or 1 millimeter. In one particular example, each microfluidic channel has a width of about 0.5 mm. In general, the channel may have any suitable length to provide a suitable pressure drop balanced with suitable particle focusing.

Microfluidic channels may be described by a cross-sectional area, width×height. In some embodiments, the cross-sectional area of the microfluidic channel may be less than 10, 9, 8, 7, 6, 5, 4, 3, or 2 millimeters squared.

Microfluidic channels may also be described by a hydraulic diameter. For a microfluidic channel having a rectangular cross-section, for example, the hydraulic diameter may be calculated as:

$$D_H = \frac{2 \times \text{height} \times \text{width}}{\text{height} + \text{width}}$$

where $D_H$ is the hydraulic diameter. Other cross-sectional shapes may be calculated according to techniques known to one of ordinary skill in the art having the benefit of this disclosure. In some embodiments, the hydraulic diameter of the microfluidic channel may be less than 5, 4, 3, 2, or 1 millimeter. In at least one embodiment, the hydraulic diameter of the microfluidic channel of the microfluidic channel may be less than 1 millimeter. In some examples, the hydraulic diameter of each microfluidic channel ranges from 75-250 microns.

Particle separator elements, which may include hydrodynamic separator elements, may be used for selective particle waste removal. In some cases, only particles above a certain size may be targeted for removal from a system. Uses for selective particle waste removal may include, but are not limited to, removal or concentration of fats in milk (fats are typically 0.1 to 15 micrometer agglomerates), removal or concentration of orange juice pulp, removal of contaminants in semi-conducting processing fluids, separating cells and/or cellular debris (such as in the production of bio pharmaceuticals), and removal of ink agglomerates in industrial ink processing. In one example related to wafer polishing slurries, particle separator elements may be designed to remove particles above a threshold size, which may be agglomerates or impurities, while letting particles below the threshold size through. In some implementations, hydrodynamic separator elements can be used as a cell retention device or be a component of a cell retention device for bioreactors.

As used herein, the term "hydrodynamic separator" refers to a curved fluid channel including, at least, an inlet to receive a fluid flow and an outlet including at least two branches to divide the fluid flow. The fluid channel may be a microfluidic channel. The inlet may receive a fluid that may contain particles of various sizes. At a particular flow rate, the hydrodynamic separator is configured to focus any particles exceeding a threshold size into one of the branches. Any remaining particles may not be focused in the fluid flow. The remaining particles may be divided among all branches, for example, based on volume fractions, or outlet flow rate ratios, associated with each branch. Hydrodynamic separators may be designed based on at least one or more of the following parameters: a Dean number, a Reynolds number, a hydraulic diameter, a radius of curvature, a target flow rate, target pressure drop, critical particle size, fluid viscosity, operating temperature (which may affect fluid viscosity), a ratio of outlet flow rates, or any combination of these. Hydrodynamic separators may also be described as Dean Flow Separators.

In general, hydrodynamic separators include curving microfluidic channels designed to focus particles exceeding a threshold size to the inside wall of the curve. The cross-sectional area of the microfluidic channel limits the maximum particle size that may enter the microfluidic channel. The device defines a geometry (such as width, height, radius of curvature, and channel length) designed to focus particles in a known fluid at a specific flow rate or flowrate range. The focused particles close to the inner wall may then be removed from the system by removing a portion of the fluid close to the inner wall. In other embodiments, depending on the device geometry and operating conditions, the particles and the waste stream may alternatively be focused close to the outer wall. The design of the device may be dependent on application flow rate, fluid properties (such as viscosity and density), and threshold particle size. The hydrodynamic separator may act as a filter or as a pre-filter in a system.

Curving microfluidic channels can be used to focus particles of a pre-determined size under appropriate flow conditions. In a curving channel or pipe under laminar flow conditions, the inertia of the fluid creates a pressure gradient across the channel. To alleviate the pressure gradient, two spiraling flows known as Dean Flows (sometimes referred to as secondary flows) may form. The Dean Flow may exhibit drag on any particles in the fluid. In larger channels, the particles may be swept along the channel in a spiraling motion. When channels become smaller, such as in microfluidic channels, the Dean Flow can be balanced with two additional forces such that particles can become trapped and focused on the inner wall of the curving channel. These forces may be described the shear-induced lift force, which causes a lift force towards the wall, and the wall-induced lift force that pushes the particle away from the wall due to bounding of fluid flow as the particle approaches the wall. Particles may be focused into a specific streamline within the curving channel. Focusing particles in this manner may be referred to as Hydrodynamic Separation or Dean Flow Separation.

Over the life of a hydrodynamic separator, some of the fluid channels may become obstructed, which may lead to an increased flow rate through the remaining channels, increased pressure drop across the channels, or both increased flow rate through the remaining channels and increased pressure drop across the channels.

FIG. 1 is a schematic representation of an example microfluidic channel component 100 with some implementations of the technology disclosed herein. The component 100 is generally configured to focus particles that are suspended in a fluid stream. The microfluidic channel component 100 has a microfluidic channel 120 having an inlet 122 and an outlet 124. The microfluidic channel 120 can have any suitable cross-sectional shape, such as circular or ovate. In some embodiments, the microfluidic channel 120 has a polygonal cross-sectional shape such as a rectangular shape or a hexagonal shape.

The fluid is configured to flow through the inlet 122, along the microfluidic channel 120 to the outlet 124. A first channel outlet 125 and a second channel outlet 127 can extend to other systems or other system components through, for example, a first outlet flow path 114 and a second outlet flow path 116, respectively, defined by the microfluidic channel component 100. In some embodiments, fluid flowing through the first channel outlet 125 is configured to have a higher concentration of particles (which is referred to herein as the "high particle concentration branch") within a particular size range compared to fluid flowing through the second channel outlet 127 (which is referred to herein as the "low particle concentration branch").

The microfluidic channel components 100 consistent with the technology disclosed herein are generally constructed of a substrate 110. The substrate 110 defines the microfluidic channel 120 therein. The substrate can be constructed of a variety of different materials and combinations of materials. The substrate can be polymeric, in some embodiments. In some embodiments the substrate is polydimethylsiloxane (PDMS). In some embodiments, the substrate is polycarbonate. In some embodiments, the substrate is an acrylic. In some embodiments the substrate can include glass. In some embodiments the substrate can include a non-reactive metal. The microfluidic channel 120 can be formed in the substrate 110 through molding operations, photolithography, and 3D printing, as examples. In some examples, the microfluidic channel 120 is formed in the substrate 110 through injection molding or embossing of plastics. Other approaches can also be used to form the microfluidic channel 120.

The microfluidic channel 120 is generally configured to accommodate liquid flow. The microfluidic channel 120 defines the inlet 122 and the outlet 124. The microfluidic channel 120 defines a channel length LD from the inlet 122 to the outlet 124. The microfluidic channel 120 is generally curved to define an inner radius $R_C$ about a central axis x. As such, the microfluidic channel 120 extends circumferentially about the central axis x to define a channel arc measure. In the current example, the microfluidic channel 120 extends about 340° about the central axis x.

The microfluidic channel 120 is configured to receive a liquid having a Reynolds number (Re) within the microfluidic channel. The fluid flow within a curving channel is described by two non-dimensional numbers, the Reynolds number and the Dean Number. The Reynolds number describes the ratio of inertial forces to viscous forces, and is defined as:

$$Re = \frac{\rho U D_H}{\mu}$$

where $\rho$ is the fluid density, $D_H$ is the hydraulic diameter of the channel, U is the average fluid velocity, and $\mu$ is the dynamic viscosity of the fluid. In hydrodynamic separators the Reynolds number is typically small (<1000), which means that viscous forces dominate. In various embodiments, the system is configured to have a Dean Number (De) between 5 and 25. In some embodiments, the system is configured to have a Dean Number between 5 and 20. The Dean number describes fluid behavior in a curved pipe and accounts for inertial forces, centripetal forces, and viscous forces acting on the fluid. The Dean number is defined as:

$$De = Re\sqrt{\frac{D_H}{2R_c}} = \frac{\rho U D_H}{\mu}\sqrt{\frac{D_H}{2R_c}}.$$

The hydrodynamic system 10 is generally configured to focus particles in the microfluidic channel 120. As used herein, the term "particle" refers to a discrete amount of material, which is dispersed in a fluid. Non-limiting examples of material that may be formed particles include dirt, metal, air bubbles, fat, water droplets. In one particular example, water droplets may be dispersed in a hydrocarbon fluid, such as gasoline or diesel fuel, to form an emulsion. In another example, air bubbles may be dispersed in a hydraulic fluid. In yet other examples, particles may be pulp in orange juice, fat in milk, and impurities in beer or wine.

In various implementations, microfluidic channel component 100 is configured to focus particles having a diameter of greater than 8% of the hydraulic diameter of the microfluidic channel 120. Particles whose diameter are greater than 8% of the channel hydraulic diameter are generally focused towards the inner wall when the Dean Number ranges from 5 to 25. The hydrodynamic separator is generally configured to focus particles having a diameter that is less than or equal to 50% of the channel height. In various examples, for purposes of calculations provided herein, the particles have a sphericity of greater than 0.5. For non-spherical particles, for purposes of calculations provided herein, the particle diameter is considered to be the equivalent spherical diameter. In various embodiments, hydrodynamic separators consistent with the technology disclosed herein are configured to focus particles having a density up to five times as dense as the liquid in the microfluidic channel 120.

Particle focusing occurs in two distinct stages. The first stage is a particle migration stage where the suspended particles migrate from across the microfluidic channel 120 to the top and bottom edges of the microfluidic channel 120. Referring again to FIG. 1, the particle migration stage generally starts at the microfluidic channel inlet 122 and extends a particle migration length $L_o$ of the microfluidic channel 120 to define the particle migration region 126 of the microfluidic channel 120. In this region no additional focusing on the inside wall 121 of the microfluidic channel 120 is observed. The second region is a linear focusing region 128 in which the amount of focusing on the inside wall 121 increases linearly along the channel length. The focusing continues until a maximum particle focusing is reached. No additional focusing is observed after maximum particle focusing is reached. Linear focusing region 128 has a linear focusing length $L_f$ that is the length necessary to achieve maximum particle focusing. The linear focusing region 128 generally extends from the particle migration region 126 towards the channel outlet 124.

In some implementations there may be a length of the microfluidic channel 120 after the linear focusing region 128 that is referred to as the fully focused region. The fully focused region a length that extends from the linear focusing region 128 to the outlet 124. In various implementations it can be desirable to limit or eliminate the fully focused region in order to decrease the energy requirements of the system by lowering the pressure drop across the microfluidic channel 120 while still achieving maximum particle focusing.

Figure 2:
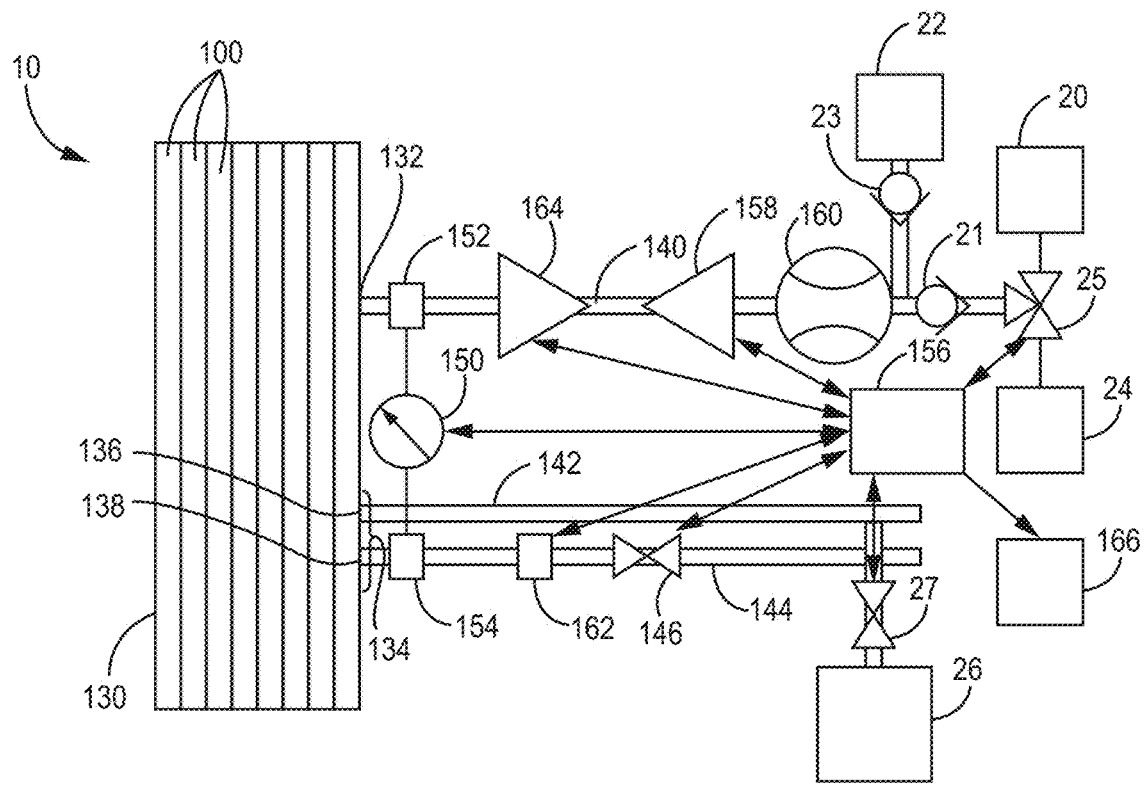
FIG. 2 is a schematic representation of an example hydrodynamic separator system consistent with embodiments.

FIG. 2 is an example hydrodynamic separator system 10 consistent with embodiments. The system 10 has a hydrodynamic separator element 130 defining an element inlet 132 and an element outlet 134. The element outlet 134 has two branches: a first element outlet 136 and a second element outlet 138. In some embodiments, the first element outlet 136 is configured to receive fluid having a relatively low concentration of particles of a particular size and the second element outlet 138 is configured to receive fluid having a relatively high concentration of particles of a particular size during normal operation of the hydrodynamic separator system 10. In some other embodiments there is a reverse configuration where the second element outlet 138 is configured to receive fluid having a relatively low concentration of particles of a particular size and the first element outlet 136 is configured to receive fluid having a relatively high concentration of particles of a particular size during normal operation of the hydrodynamic separator system 10.

The hydrodynamic separator element 130 generally has a plurality of microfluidic channel components 100, such as that described above with reference to FIG. 1. The microfluidic channel components 100 can be in a stacked configuration, for example. Each microfluidic channel component 100 has a curved microfluidic channel 120 (see FIG. 1) and the curved microfluidic channels 120 are in fluid communication. The microfluidic channels 120 are configured to operate in parallel during normal operation of the hydrodynamic separator element 130. In various embodiments, the microfluidic channel component 100 has at least 10 microfluidic channels. In various embodiments, the microfluidic channel component 100 has at least 50 microfluidic channels or at least 100 microfluidic channels. In some embodiments the microfluidic channel component has 200 or more microfluidic channels. In some embodiments the microfluidic channel component has 800 or more, 900 or more, or even 1000 or microfluidic channels.

Figure 3:
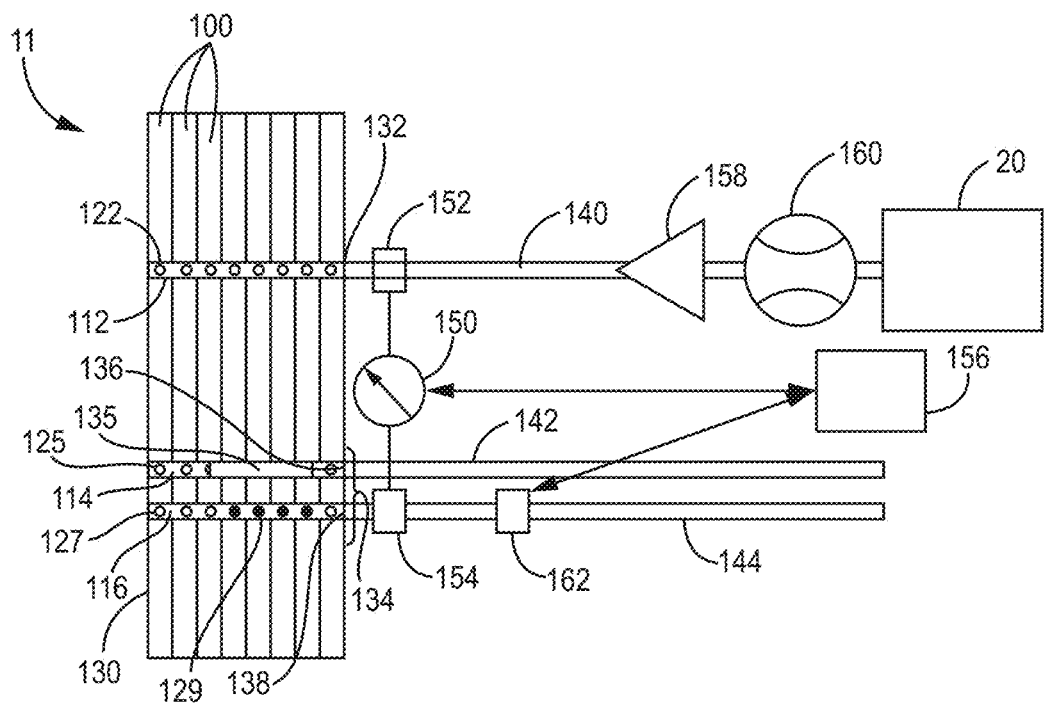
FIG. 3 is a schematic representation of an example hydrodynamic separator system consistent with embodiments.

The channel inlets 122 of each of the microfluidic channel components 100 are in fluid communication. All of the channel inlets 122 (FIG. 1) are downstream of the element inlet 132 (FIG. 3). An inlet conduit 140 is fluidly coupled to the element inlet 132 of the hydrodynamic separator element 130. The inlet conduit 140 is coupled to the element 130 about the element inlet 132. The inlet conduit 140 is in fluid communication with each of the channel inlets 122. In this particular example, the substrates 110 of each of the microfluidic channel components 100 cumulatively define an inlet flow path 112 (partially visible in FIG. 1) that extends from the element inlet 132 to the channel inlet 122 of each microfluidic channel component 100.

The first channel outlets 124 of each of the microfluidic channel components 100 are in fluid communication. All of the first channel outlets 124 are in fluid communication with the first element outlet 136 and, in particular, are upstream of the first element outlet 136. In this particular example, the substrates 110 of each of the microfluidic channel components 100 cumulatively define a first outlet flow path 114 (visible in FIG. 1) that extends from each first channel outlet 125 of each microfluidic channel component 100 to the first element outlet 136. The second channel outlets 127 of each of the microfluidic channel components 100 are in fluid communication. All of the second channel outlets 127 are in fluid communication with the second element outlet 138 and are upstream of the second element outlet 138. It is noted that, in some embodiments, there may be a third channel outlet, a fourth channel outlet, and so on. In this particular example, the substrates 110 of each of the microfluidic channel components 100 cumulatively define a second outlet flow path 116 (visible in FIG. 1) that extends from each second channel outlet 127 branch to the second element outlet 138. A first outlet conduit 142 is coupled to the first element outlet 136 and a second outlet conduit 144 is coupled to the second element outlet 138.

As the hydrodynamic separator element 130 is operated over time, channels 120 may become partially or totally clogged with the particles. Assuming a relatively constant flow rate through the element 130 as a whole, as channels 120 become blocked, the average fluid velocity through the remaining channels increases, which directly increases the Dean Number. If the average fluid velocity through the open channels increases such that the Dean Number exceeds 25, then the performance of the element 130 concentrating particles within the fluid stream decreases. In some implementations, the performance of the element 130 concentrating particles within the fluid stream can start to decrease at a Dean Number of 20, 21, 22, 23, 24 or 25. Referring to the Dean Number equation provided above, the maximum increase in the average fluid velocity through the open channels, while remaining within the operable Dean Number range to achieve particle focusing, is four times the original average fluid velocity (with a clean element). This maximum increase is consistent with an original Dean Number of the system being at the minimum of the operating range (5), and the "dirty" system having a Dean Number being at the maximum of the operating range (25).

Below is the equation describing an observed flow rate (X) through each of the channels as a function of the original flow rate $X_0$ (through each of the "clean" element channels) based on the original number of microfluidic channels no and the observed number of plugged microfluidic channels $n_p$.

$$X = \frac{X_0 n_0}{n_o - n_p}.$$

Generally the increase between the flow rate through the channels and the pressure differential across the channels are substantially linearly related. As such, the observed pressure differential P at the observed flow rate X can be expressed in terms of the original pressure differential $P_0$ of the clean element, the original number of microfluidic channels no and the observed number of blocked microfluidic channels $n_p$:

$$P = \frac{P_0 n_0}{n_o - n_p}.$$

To calculate the number of blocked channels the equation can be re-arranged as the following:

$$n_p = \frac{(P - P_0) n_0}{P}.$$

In various embodiments, the system 10 has a flow characteristic sensor 150 in sensing communication with the plurality of microfluidic channels. The flow characteristic sensor 150 is generally configured to sense a flow characteristic. When outside of a particular threshold, the flow characteristic may be indicative of a threshold number of channels that are blocked. For example, the flow characteristic can be one or more characteristic including flow rate, pressure drop, turbidity, particle count, particle concentration, pH, resistance, conductance, capacitance, and a dielectric property. The flow characteristic can be a relative measurement or an absolute measurement. The flow characteristic can be measured at each individual microfluidic channel component 100 or relative to the entire hydrodynamic separator element 10. For example, the flow characteristic can be measured at one or more of the first channel outlet 125, the second channel outlet 127, and the channel inlet 122 of the microfluidic channel 120 of each microfluidic channel component 100. As another example, the flow characteristic can be measured at one or more of the first element outlet 136, the second element outlet 138, and element inlet 132.

Various types of flow characteristic sensors can be used in conjunction with hydrodynamic separator elements 10 disclosed herein. The flow characteristic sensor can include one or more of an electrical property sensor, an optical sensor, a flow meter, and a pressure sensor, as examples, although other types of flow characteristic sensors are certainly contemplated. In some embodiments the flow characteristic sensor is a particle sensor. In some embodiments the flow characteristic sensor is a turbidity sensor. In some embodiments the flow characteristic sensor is a paired optical emitter and receiver on opposite sides of an optically transparent portion of a flow channel. The flow characteristic sensor can include a Coulter Counter (manufactured by Beckman Coulter, based in Indianapolis, Indiana), pH sensor, dielectric sensor, resistance sensor, and impedance sensors, as other examples.

In this example, the flow characteristic sensor 150 includes a pressure sensor 150 in sensing communication with the element inlet 132 and the element outlet 134. The pressure sensor 150 is configured to sense the differential pressure between the element inlet 132 and the element outlet 134. In particular, the pressure sensor 150 can have a first sensor 152 configured to measure the fluid pressure on the element inlet 132 side of the element 130 and the pressure sensor 150 can have a second sensor 154 configured to measure the fluid pressure on the outlet side of the element 130. In some embodiments the pressure sensor 150 is a pressure switch that triggers when the pressure differential (or change in differential pressure) is greater than a threshold $P_T$.

In the example of FIG. 2, the second sensor 154 of the pressure sensor 150 is positioned along the second outlet conduit 144 adjacent the second element outlet 138. In an alternative configuration, the second sensor 154 of the pressure sensor 150 is positioned along the first outlet conduit 142 adjacent the first element outlet 136. In some embodiments the pressure sensor is configured to sense the pressure differential between the element inlet and the low particle concentrate branch of the element outlet. In some other embodiments the pressure sensor is configured to sense the pressure differential between the element inlet and the high particle concentrate branch of the element outlet. Such a configuration advantageously allows monitoring of the microfluidic channels that are exposed to the highest concentration of particles. In some embodiments the pressure sensor is configured to sense the pressure differential between the element inlet and the high particle concentrate branch of the element outlet and the pressure differential between the element inlet and the low particle concentrate branch of the element outlet. In some embodiments the pressure sensor 150 can be omitted and an alternative flow characteristic sensor can be in sensing communication with the separator element 130 or a flow characteristic sensor can be omitted from the system.

The system generally has a controller 156 that is in data communication with the flow characteristic sensor 150 which, in this case, is the pressure sensor 150. The controller 156 is generally configured to provide a first output upon the flow characteristic (which in this case in the pressure differential) being outside of a first threshold. In some embodiments, the first output includes a first alert upon the pressure differential exceeding a first threshold ($P_T$). In some embodiments, the first output includes an instruction from the controller to a maintenance sub-system to engage in a maintenance operation. In some embodiments, the first output includes an instruction to an operator to engage in a maintenance operation.

In some embodiments, the first threshold $P_T$ can be associated with or represent the necessity of an impending maintenance operation, such as cleaning of the channels of the hydrodynamic separator element 130. Cleaning of the channels of the hydrodynamic separator element 130 can be achieved, in one example, by flushing each of the channels with a relatively high-pressure fluid. In some implementations, the channels may be flushed with fluid in the reverse direction compared to normal operation of the microfluidic channels. In some embodiments, the first pressure threshold $P_T$ can result in an output by the controller 156 informing a user that the hydrodynamic separator is no longer operational. In some embodiments the first pressure threshold $P_T$ correlates with a particular number of microfluidic channels 120 being clogged. In some embodiments the first pressure threshold $P_T$ is a threshold change in differential pressure relative to the initial pressure differential measurement $P_O$.

In some embodiments, at least one of the pressure sensor 150 and the controller 156 is configured to adjust the differential pressure measurement to correct for the pressure losses attributed to the system configuration rather than clogging of microfluidic channels 120. For example, pressure losses attributable to changes in flow area, changes in the direction (like a sharp bend in a conduit or microfluidic channel), and the like. In some other embodiments the pressure sensor 150 or the controller 156 is configured to track the changes in pressure differential over time, which inherently corrects for pressure drops inherent to the system.

The system generally has a flow generator 158 that is configured to generate flow through the hydrodynamic separator element 130. The flow generator 158 creates fluid communication between a fluid source 20 and the hydrodynamic separator element 130. The flow generator 158 in fluid communication with the element inlet 132 and the element outlets 136, 138. In particular, the flow generator 158 is configured to pump fluid from the fluid source 20 through the inlet conduit 140 to the inlet 122 of the element 130. The fluid is configured to flow through the microfluidic channels 120 of each of the microfluidic channel components 100 to the outlet 124. Although in the current example the flow generator 158 is coupled to the inlet conduit 140, in some other embodiments the flow generator 158 is directly coupled to the separator element 130.

In some embodiments the flow generator 158 is a pump. In some embodiments the flow generator 158 is a pressure-driven flow control in fluid communication with the element inlet 132. The flow generator 158 can be configured to control the flow of fluid through the system 10 by pressure or flow rate. In various embodiments, the flow generator 158 is configured to flow fluid through the element inlet 132 at a constant flow rate. The system 10 can have a flow meter 160 in fluid communication with the element inlet 132 such as at the inlet conduit 140 (for example), to monitor the real time flow rate. In some embodiments the pressure is set to achieve a particular flow rate.

In some embodiments the system can have a first flow characteristic sensor 150 and a second flow characteristic sensor 162. Each flow characteristic sensor 150, 162 can be consistent with flow characteristic sensors described above. In some examples, the second flow characteristic sensor 162 can be a particle sensor in monitoring communication with the first element outlet 136 or the second element outlet 138. The particle sensor 162 can generally be in communication with the low particle concentrate branch of the element outlet. Such a configuration allows the particle sensor 162 to provide signal data representing a signal corresponding to the fluid and/or any particles in the fluid. The particle sensor 162 can be in data communication with the controller 156.

In some embodiments, upon detecting a threshold amount of particles within a particular size range in the fluid, the controller 156 can be configured to provide an output, such as an alert, indicative of the reduced effectiveness of the hydrodynamic separator element 130. In some embodiments, upon detecting a threshold amount of particles within a particle size range in the fluid and detecting a pressure differential beyond a first pressure threshold, the controller 156 is configured to provide an output, such as an alert. The alert can be provided to a user interface 166. The user interface 166 can be a display, speaker, indicator light, or the like.

In some embodiments, the second flow characteristic sensor 162 can be omitted. In some other embodiments, the second flow characteristic sensor 162 can be a different type of sensor, examples of which are described in detail above.

In some embodiments, the system 10 incorporates a maintenance system in fluid communication with the hydrodynamic separator element 130. The maintenance system is generally configured to dislodge particles that are lodged in the system 10, such as particles that partially or completely clog the channels 120. The maintenance system is generally configured to modify the fluid flow through the separator element 130 to dislodge such particles. In some embodiments, the maintenance system has manually operated components whereby a user executes maintenance operations. In such examples, the controller 156 can be configured to output an alert to a user to engage the maintenance system.

In some other embodiments, the controller 156 is in operative communication with the maintenance system. The controller 156 can be configured to automatically selectively engage and disengage the maintenance system upon detecting that the flow characteristic received from the flow characteristic sensor is outside of a threshold. In other examples, the controller 156 can be configured to automatically selectively engage and disengage the maintenance system on a regular, periodic basis. Such a configuration may advantageously limit the build-up of particles in the system 10 that may otherwise have blocked or partially blocked flow channels, which may advantageously improve system performance. Such a configuration may advantageously limit periods of time with declining system performance due to particle build-up within the separator element 130.

For example, the controller 156 can be configured to engage the maintenance system after a first period of time within which fluid flow through the hydrodynamic separator element 130 is at a constant flow rate. The first period of time can be less than or equal to 48 hours or less than or equal to 24 hours, as examples. The controller 156 can be configured to retain the maintenance system in engagement for a second period of time. During the second period of time, the fluid flow through the separator element 130 is modified. During the second period of time, particles that may have settled within the separator element 130 may be dislodged as a result of the modification in fluid flow. In some embodiments, the controller 156 can be configured to disengage the maintenance system after the second period of time. The engagement and disengagement of the maintenance system over the second period of time may advantageously create a "pulse" in fluid flow through the element 130, meaning that there is a relatively short burst in fluid flow volume through the element 130.

After the maintenance system is disengaged, the fluid flow through the hydrodynamic separator element 130 can return to the constant flow rate for another first period of time. The controller 156 can alternately and repeatedly engage the maintenance system after the first period of time and disengage the maintenance system after the second period of time. In various embodiments, the controller 156 is configured to engage and disengage the maintenance system relatively rapidly to cause a "pulse" in fluid flow.

Such a pulse may advantageously improve dislodgement of particles in the hydrodynamic separator element 130 that may have settled in the element 130. The second period of time can be less than the first period of time. In some embodiments the second period of time is less than 10 seconds, less than 5 seconds, or less than 3 seconds.

In the example of FIG. 2, the system 10 has an obstruction 146 that is in selective obstructive communication with one or more of the microfluidic channels 120 (FIG. 1). The obstruction 146 is generally configured to selectively obstruct a portion of the fluid flow through the hydrodynamic separator element 130 such that fluid flow is increased along the unblocked flow paths through the element 130. The increase in fluid flow may advantageously dislodge particles that have settled in the system 10. As such, the obstruction 146 is considered a component of the maintenance system. It is noted that the obstruction 146 need not necessarily form a complete, 100% obstruction of the corresponding channels. Rather, the obstruction 146 can be a partial obstruction, such as selectively obstructing at least 50%, 75%, or 80% across the cross-sectional flow area of the relevant channel(s). In some embodiments the obstruction can be configured to obstruct 80% to 100% of the cross-sectional flow area of the relevant channel(s).

The obstruction 146 can be a valve in selective obstructive communication with an element outlet. In the current example, the obstruction 146 is in selective obstructive communication with the second element outlet 138. In such embodiments, the output of the controller 156 is configured to result in engagement of the valve 146 to obstruct the second element outlet. In various examples, the obstruction 146 is in selective obstructive communication with the low particle concentration branch of the element outlet 134.

The controller 156 can be configured to engage and disengage the obstruction 146 as discussed above with respect to the maintenance system generally. The controller 156 can be configured to engage the obstruction 146 via a first output in response to a flow characteristic of a flow characteristic sensor being outside of a threshold. In such embodiments, engaging the obstruction is in response to a sensed particle settling along one or more microfluidic channels. In some other embodiments, the controller 156 can be configured to engage the obstruction 146 on a regular, periodic basis. In such embodiments, the controller 156 can be configured to engage the obstruction 146 via a first output in response to the passing of a particular period of time. In such examples, the controller 156 can be configured to leave the obstruction disengaged for a first period of time, during which the fluid flow through the hydrodynamic separator element 130 is at a constant flow rate. Upon the passing of the first period of time, the controller 156 can be configured to provide a first output resulting in engaging the obstruction 146, which modifies the fluid flow through the separator element. The controller 156 can maintain the obstruction 146 in an engaged position for a second period of time. In some embodiments the obstruction 146 can be omitted from the system 10.

In some embodiments, the flow generator 158 can be a component of the maintenance system. In such embodiments the controller 156 can be in operative communication with the flow generator 158. The controller 156 can be configured to engage the flow generator 158 to modify fluid flow through the hydrodynamic separator element 130 as a maintenance operation. In some embodiments, the controller 156 is configured to engage the flow generator 158 to pulse fluid through the hydrodynamic separator element 130. During the pulsing, the flow generator 158 may increase the fluid flow rate through the separator element 130. Similar to discussions above, the pulsing of the fluid may dislodge particles from the separator element 130.

In some other embodiments, the controller 156 is configured to cause the flow generator 158 to temporarily reverse flow direction of the fluid through the system 10, such that fluid flows from the element outlet 134 towards the element inlet 132. The reversal of the fluid flow direction through the separator element 130 can be referred to as "back-flushing," during which the maintenance system is considered to be "engaged" by the controller. In various embodiments, the maintenance system is considered to be "disengaged" by the controller when the fluid flow through the separator element 130 returns to a constant fluid flow rate from the inlet to the outlet.

In some embodiments where the controller 156 is configured to engage the flow generator 158 to reverse fluid flow through the separator element 130, the fluid flowing out from the element inlet 132 can return to the fluid source 20 through the inlet conduit. In some other examples, such as the one depicted, a waste reservoir 22 can be in fluid communication with the inlet conduit 140, and the fluid flowing out from the element inlet 132 bypass the fluid source 20 and are instead directed to the waste reservoir 22. While various configurations can be implemented to achieve such functionality, in the current example, a first one-way valve 21 is fluidly coupled to the inlet conduit 140 between the fluid source 20 and the element inlet 132. The first one-way valve facilitates fluid flow from the fluid source 20 to the element inlet 132 and obstructs fluid flow from the element inlet 132 to the fluid source 20. A second one-way valve 23 is fluidly coupled to the inlet conduit 140 between the waste reservoir 22 and the element inlet 132. The second one-way valve 23 facilitates fluid flow from the element inlet 132 to the waste reservoir 22 and obstructs fluid flow from the waste reservoir 22 to the element inlet 132.

Alternative configurations are possible. In one such configuration, a three-way control valve can selectively fluidly couple each of the fluid source 20 and the waste reservoir 22 to the element inlet 132 along the inlet conduit 140. In such embodiments, the controller 156 can be in operative communication with the three-way valve. The controller 156 can fluidly couple the fluid source 20 and the element inlet 132 and obstruct the fluid connection between the waste reservoir 22 and the element inlet 132 when the flow generator 158 is operating in a default state. The controller 156 can fluidly couple the waste reservoir 22 and the element inlet 132 and obstruct the fluid connection between the fluid source 20 and the element inlet 132 when the flow generator 158 is operating in reverse, which is when the maintenance system is engaged.

The controller 156 can be configured to engage and disengage the flow generator 158 as discussed above with respect to the maintenance system generally. In embodiments, the controller 156 can be configured to engage the flow generator 158 upon the flow characteristic being outside of a first threshold. The controller 156 can be configured to engage the flow generator 158 via a first output in response to a flow characteristic of a flow characteristic sensor (150, 162) being outside of a threshold. In some other embodiments, the controller 156 can be configured to engage the flow generator 158 on a regular, periodic basis. In such embodiments, the controller 156 can be configured to engage the flow generator 158 via a first output in response to the passing of a particular period of time. In such examples, the controller 156 can be configured to leave the flow generator 158 disengaged for a first period of time, during which the fluid flow through the hydrodynamic separator element 130 is at a constant flow rate. Upon the passing of the first period of time, the controller 156 can be configured to provide a first output resulting in engaging the flow generator 158, which modifies the fluid flow through the separator element 130. The controller 156 can maintain the flow generator 158 in an engaged position for a second period of time. The first period of time and the second period of time can be consistent with discussions above.

In yet another configuration, the flow generator 158 is not operated in reverse and rather a reverse flow generator, or second flow generator 164, is in fluid communication with the plurality of microfluidic channels. In such an example, the controller 156 is in operative communication with the first flow generator 158 and the second flow generator 164. The second flow generator 164 is a component of the maintenance system. In such an example, the controller 156 is configured to switch between operating the first flow generator 158 (under a constant flow rate and normal operating conditions) and the second flow generator 164 to execute the maintenance operation. The second flow generator 164 is configured to generate fluid flow through the separator element 130 in the reverse direction of the first flow generator 158. While in the current example, the second flow generator 164 is disposed along the inlet conduit 140, in other examples the second flow generator 164 can be disposed along one or both of the outlet conduits 142, 144. In some embodiments the second flow generator 164 is omitted from the system 10.

In embodiments incorporating the second flow generator 164, the controller 156 can be configured to engage and disengage the second flow generator 164 as discussed above with respect to the maintenance system generally. In such embodiments, the controller 156 is configured to disengage the first flow generator 158 when the second flow generator 164 is engaged and engage the first flow generator 164 when the second flow generator 164 is disengaged. In embodiments, the controller 156 can be configured to engage the second flow generator 164 upon the flow characteristic being outside of a first threshold.

The controller 156 can be configured to engage the second flow generator 164 via a first output in response to a flow characteristic of a flow characteristic sensor (150, 162) being outside of a threshold. In such embodiments, engaging the second flow generator 164 is in response to decreased performance of the element 130, which may be attributable to particles becoming lodged within the element 130. In some other embodiments, the controller 156 can be configured to engage the second flow generator 164, and correspondingly disengage the first flow generator 158, on a regular, periodic basis. In such embodiments, the controller 156 can be configured to engage the second flow generator 164 and disengage the first flow generator 158 via a first output in response to the passing of a particular period of time. In such examples, the controller 156 can be configured to leave the second flow generator 164 disengaged and the first flow generator 158 engaged for a first period of time, during which the fluid flow through the hydrodynamic separator element 130 is at a constant flow rate via the first flow generator 164.

Upon the passing of the first period of time, the controller 156 can be configured to provide a first output resulting in engaging the second flow generator 164 and disengaging the first flow generator 158, which modifies the fluid flow through the separator element 130. In particular, the fluid flow through the separator element 130 is reversed. The controller 156 can maintain the second flow generator 164 in an engaged state, and the first flow generator 158 in a disengaged state, for a second period of time. After the second period of time, and controller 156 can engage the first flow generator and disengage the second flow generator 164 for the first period of time. The first period of time and the second period of time can be consistent with discussions above. In various embodiments the second flow generator 164 can be omitted.

In some embodiments the maintenance system can include a CIP (clean-in-place) reservoir 24 that is configured to hold a cleaning fluid for maintenance operations. The cleaning fluid can be a fluid that is alternate to the system fluid of the fluid source 20. In some embodiments the cleaning fluid is an acidic fluid. In some embodiments the cleaning fluid is a basic fluid. In some embodiments the cleaning fluid is an enzymatic fluid. In some embodiments the cleaning fluid is simply alternate to the system fluid only in that the cleaning fluid lacks suspended particles. The CIP reservoir 24 can be in selective fluid communication with the element inlet 132 to modify fluid flow through the separator element 130 by replacing or adding to the flow of the source fluid through the separator element 130. In various embodiments incorporating a CIP reservoir 24, the controller 156 can be configured to selectively switch between the CIP reservoir 24 and the fluid source 20 being in fluid communication with the element inlet 132. In some other embodiments, the controller 156 can be configured to selectively place the CIP reservoir 24 in fluid communication with the element inlet 132 in conjunction with the fluid source 20 being in fluid communication with the element inlet 132.

In examples, the controller 156 is in operative communication with one or more valves 25 to selectively fluidly couple the CIP reservoir 24 to the separator element 130. Such valve(s) 25 is thus a component of the maintenance system. The valve 25 can be a three-way control valve that is configured to switch between fluid communication between the fluid source 20 and the separator element 130 and the CIP reservoir 24 and the separator element 130. In some such examples, the controller 156 is configured to switch between (1) fluid communication between the fluid source 20 and the separator element 130 and (2) fluid communication between the CIP reservoir 24 and the separator element 130. In various embodiments the flow generator 158 is configured to generate fluid flow from the fluid source 20 to the separator element 130 and also configured to generate fluid flow from the CIP reservoir 24 to the separator element 130 depending on the valve engagement. In some other embodiments one flow generator 158 is configured to fluidly couple the fluid source 20 to the separator element 130 and another flow generator (not shown) is configured to fluidly couple the CIP reservoir 24 to the separator element 130. In such an embodiment the controller 156 can be operatively coupled to each of the one flow generator 158 and the other flow generator.

Returning to the example depicted in FIG. 2, the controller 156 can be configured to engage and disengage the control valve 25 as discussed above with respect to the maintenance system generally. In such embodiments, the controller 156 is configured to engage the control valve 25 to bring the CIP reservoir 24 in fluid communication with the separator element 130 and bring the fluid reservoir 20 out of fluid communication with the separator element 130 during a maintenance operation. Outside of a maintenance operation, the controller 156 is configured to disengage the control valve 25 to bring the CIP reservoir 24 out of fluid communication with the separator element 130 and bring the fluid reservoir 20 into fluid communication with the separator element 130 for normal operation.

In embodiments, the controller 156 can be configured to engage the control valve 25 upon the flow characteristic from a flow characteristic sensor 150, 162 being outside of a threshold, which may be indicative of particles becoming lodged within the separator element 130. In some other embodiments, the controller 156 can be configured to engage the control valve 25 on a regular, periodic basis. In such embodiments, the controller 156 can be configured to engage the control valve 25 via a first output in response to the passing of a particular period of time. In such examples, the controller 156 can be configured to have the control valve 25 disengaged for a first period of time, during which the fluid flow through the hydrodynamic separator element 130 is at a constant flow rate via the flow generator 164 and the fluid source 20.

Upon the passing of the first period of time, the controller 156 can be configured to provide a first output resulting in engaging the control valve 25, which modifies the fluid flow through the separator element 130. In particular, the fluid flow through the separator element 130 is sourced from the CIP reservoir 24 instead of the fluid source 20. The controller 156 can maintain the control valve 25 in an engaged state for a second period of time for the maintenance operation. After the second period of time, and controller 156 can disengage the control valve 25 for the first period of time such that the fluid source 20 is again in fluid communication with the separator element 130 for normal operation of the separator element 130. The first period of time and the second period of time can be consistent with discussions above.

In some embodiments the system 10 can have a waste fluid tank 26 in selective fluid communication with the separator element outlet 134. A tank valve 27 can place the waste fluid tank 26 in selective fluid communication with the outlet conduits 142, 144. The waste fluid tank 26 and the tank valve 27 can be configured to receive fluid from the CIP reservoir 24 used during a maintenance operation. The controller 156 can be in operative communication with the tank valve 27 such that, when the control valve 25 is engaged, the tank valve 27 is also engaged to bring the separator element 130 in fluid communication with the tank valve 27. In some embodiments there can be a delay between the controller engaging the control valve 25 and the controller engaging the tank valve 27. Furthermore, in some embodiments there can be a delay between the controller 156 disengaging the control valve 25 and disengaging the tank valve 27 to accommodate the delay between cleaning fluid entering the separator element 130 and leaving the separator element 130. In particular, after the control valve 25 is disengaged, source fluid will start to flow into the separator element 130 and the cleaning fluid already present within the separator element 130 from the maintenance operation will continue to move towards the element outlet 134 for a period of time after the control valve 25 has been disengaged. In some embodiments, the cleaning tank 24, control valve 25, and the waste fluid tank 26 can be omitted and alternate maintenance system components can be used.

While FIG. 2 depicts various components that can be included in the maintenance system of the separator system, many of these components can be used interchangeably or alternatively or in combination. While not currently visible, the system depicted in FIG. 2 can incorporate one or more barriers in fluid communication with a plurality of the channel inlets 122, a plurality of the first channel outlets 125, a plurality of the second channel outlets 127, or a combination of a plurality of channel inlets 122, a plurality of the first channel outlets 125, and a plurality of the second channel outlets 127. Such example barriers are depicted in FIG. 3 and described in more detail below.

One or more of the components, such as the controllers, indicators, sensors, detectors, or systems, described herein may include a processor, such as a central processing unit (CPU), computer, logic array, or other device capable of directing data coming into or out of the component. The processor may include one or more computing devices having memory, processing, and communication hardware. The processor may include circuitry used to couple various components of the controller together or with other components operably coupled to the controller. The functions of the processor may be performed by hardware and/or as computer instructions on a non-transient computer readable storage medium.

The processor may include any one or more of a microprocessor, a microcontroller, a digital signal processor (DSP), an application specific integrated circuit (ASIC), a field-programmable gate array (FPGA), and/or equivalent discrete or integrated logic circuitry. In some examples, the processor may include multiple components, such as any combination of one or more microprocessors, one or more controllers, one or more DSPs, one or more ASICs, and/or one or more FPGAs, as well as other discrete or integrated logic circuitry. The functions attributed to the processor herein may be embodied as software, firmware, hardware, or any combination thereof.

In one or more embodiments, the functionality of the processor may be implemented using one or more computer programs using a computing apparatus, which may include one or more processors and/or memory. Program code and/or logic described herein may be applied to input data/information to perform functionality described herein and generate desired output data/information. The output data/information may be applied as an input to one or more other devices and/or methods as described herein or as would be applied in a known fashion. In view of the above, it will be readily apparent that the controller functionality as described herein may be implemented in any manner known to one skilled in the art.

FIG. 3 is a schematic representation of a partial cross-sectional view of a hydrodynamic separator system 11 consistent with embodiments described above. The hydrodynamic separator element 130 generally has a plurality of microfluidic channel components 100, such as that described above with reference to FIG. 1. The microfluidic channel components 100 are in a stacked configuration. Each microfluidic channel component 100 has a curved microfluidic channel 120 (see FIG. 1) and the curved microfluidic channels 120 are in fluid communication. The microfluidic channels 120 are configured to operate in parallel during normal operation of the hydrodynamic separator element 130.

In the current example, the separator element 130 is depicted with a plurality of removed sections such that the inlet flow path 112, the first outlet flow path 114, and the second outlet flow path 116 are visible. The channel inlets 122 of each of the microfluidic channel components 100 are in fluid communication. All of the channel inlets 122 (FIG. 1) are downstream of the element inlet 132 (FIG. 3). An inlet conduit 140 is fluidly coupled to the element inlet 132 of the hydrodynamic separator element 130. The inlet conduit 140 is coupled to the element 130 about the element inlet 132. The inlet conduit 140 is in fluid communication with each of the channel inlets 122. In this particular example, the substrates 110 of each of the microfluidic channel components 100 cumulatively define the inlet flow path 112 that extends from the element inlet 132 to the channel inlet 122 of each microfluidic channel component 100.

The substrates 110 of each of the microfluidic channel components 100 cumulatively define a first outlet flow path 114 that extends from each first channel outlet 125 of each microfluidic channel component 100 to the first element outlet 136. The second channel outlets 127 of each of the microfluidic channel components 100 are in fluid communication. All of the second channel outlets 127 are in fluid communication with the second element outlet 138 and are upstream of the second element outlet 138. In this particular example, the substrates 110 of each of the microfluidic channel components 100 cumulatively define the second outlet flow path 116 that extends from each second channel outlet 127 branch to the second element outlet 138. A first outlet conduit 142 is coupled to the first element outlet 136 and a second outlet conduit 144 is coupled to the second element outlet 138.

In the current example, the separator system 11 has a maintenance system including an obstruction that is a barrier 129 disposed in fluid communication with the second outlet flow path 116. The barrier 129 is configured to selectively obstruct a portion of the plurality of second channel outlets 127 along the second outlet flow path 116 while leaving at least one second channel outlet 127 unobstructed. In various embodiments the barrier 129 is a mechanical component disposed in the second outlet flow path 116. In the current example the barrier 129 is a plurality of valves 129 each in selective obstructive communication with a corresponding microfluidic channel. In such an example, each of the plurality of microfluidic channels can have a corresponding valve 129 in selective obstructive communication with the channel. The controller 156 can be in operative communication with each of the valves 129 and can be configured to selectively engage each of the plurality of valves 129.

The controller 156 is configured to selectively switch the maintenance system among the individual microfluidic channels such that the maintenance system is in alternating fluid communication with individual microfluidic channels. More particularly, in some embodiments the controller 156 is configured to selectively engage and disengage groups of the plurality of valves 129 in a staggered or alternating manner such that fluid flow is increased in the fluid channels remaining open (where the corresponding valves 129 are disengaged) to help dislodge particles that may have settled in such channels. In this respect the fluid flow is configured to alternate among the microfluidic channels. In some embodiments the engagement and disengagement of such valves 129 is randomized by the controller 156. In some other embodiments the controller 156 is configured to selectively engage and disengage groups of valves in a repeated process.

The controller 156 can be configured to automatically selectively engage and disengage the valves 129 of the maintenance system upon detecting that the flow characteristic received from the flow characteristic sensor 150, 162 is outside of a threshold. In such embodiments, upon detecting that the flow characteristic is outside the threshold, the controller 156 can selectively engage a first group of the plurality valves 129 and maintain a second group of the plurality of valves 129 in a disengaged state for a first duration of the maintenance operation to make a first modification to fluid flow through the separator element 130. After the first duration, the controller 156 can selectively engage the second group of the plurality of valves 129 and disengage the first group of the plurality of valves 129 for a second duration of the maintenance operation to make a second modification to fluid flow through the separator element 130. The controller can disengage each of the plurality of valves 129 when the maintenance operation is complete, at which point the system 10 can proceed with normal operation until again the controller 156 detecting the flow characteristic is outside of the threshold.

In other examples, the controller 156 can be configured to automatically selectively engage and disengage the plurality of valves 129 of the maintenance system on a regular, periodic basis. For example, the controller 156 can be configured to engage the plurality of valves 129 of the maintenance system after a first period of time within which fluid flow through the hydrodynamic separator element 130 is at a constant flow rate and no maintenance operation is being executed. The controller 156 can be configured to engage the maintenance system for a second period of time during which a maintenance operation is executed.

During a first stage of the second period of time (i.e., the maintenance operation), the fluid flow through the separator element 130 is modified by the controller 156, which engages a first group of the plurality of valves 129 while leaving a second group of the plurality of valves 129 disengaged. During a second stage of the second period of time, the fluid flow through the separator element 130 is modified by the controller 156, which disengages the first group of the plurality of valves 129 while engaging the second group of the plurality of valves 129. In such embodiments the controller 156 can be configured to disengage the maintenance system after the second period of time. In some other embodiments the maintenance system is always engaged and cycles through each of the microfluidic channels in conjunction with normal operation of the remainder of the microfluidic channels. In some other embodiments the maintenance operation is completed in a single stage where all of the plurality of valves 129 are engaged and then disengaged simultaneously, which selectively obstructs and clears all of the second channel outlets 127 simultaneously. In such an implementation, all of the fluid flowing through the separator element 130 is directed through the plurality of the first channel outlets 125.

In some embodiments, the maintenance system can additionally or alternatively incorporate barriers along the inlet flow path 112 and/or the first outlet flow path 114. Some such barriers can otherwise be consistent with the description above. For example, instead of being configured to selectively obstruct the plurality of second channel outlets 127, the plurality of valves 129 can be configured to selectively obstruct a portion of the plurality of first channel outlets 125 along the first outlet flow path 114 while leaving at least one first channel outlet 125 unobstructed. In other examples, the plurality of valves 129 can be configured to selectively obstruct and clear all of the plurality of first channel outlets 125 along the first outlet flow path 114 simultaneously.

In other examples, one or more of the inlet flow path 112, the first outlet flow path 114, and the second outlet flow path 116 can incorporate other types of barriers that are components of the maintenance system. In the current example, a barrier 135 can be a mechanical component disposed in, or at least in fluid communication with, a flow path, such as the first outlet flow path 114. The barrier 135 is configured to selectively obstruct at least a portion of the plurality of first channel outlets 125 along the first outlet flow path 114. In some embodiments the barrier 135 is configured to leave at least one first channel outlet 125 unobstructed when a portion of the plurality of first channel outlets 125 are obstructed. In some examples the barrier 135 is slidably disposed in the first outlet flow path 114. Here the barrier 135 has a length that is greater than the distance between two consecutive channel outlets 125 along the first outlet flow path 114, such that the barrier 135 is configured to obstruct at least two consecutive channel outlet 125. In some embodiments the barrier 135 has a length greater than the distance across at least 10 consecutive channel outlets along the first outlet flow path 114. As such, the barrier 135 is configured to obstruct the at least 10 consecutive channel outlets along the first outlet flow path 114.

The barrier 135 can be a solid body or a tube, as examples. In some embodiments the barrier 135 can be translatable outside of the separator element 130 outside of maintenance operations. In embodiments where the barrier 135 is a tube, the barrier 135 can be translatable from the separator element 130 to the corresponding conduit (here, the first outlet conduit 142) to clear each of the corresponding channel branches (here, the first channel outlet 125). In some embodiments the barrier 135 can be translatable outside of the separator element and the corresponding conduit.

The controller 156 can be in operable communication with the barrier 135 and can be configured to linearly translate the barrier 135 across the corresponding flow path 114 to selectively obstruct groups of flow channels at the first outlet 125. In some embodiments the controller 156 can be configured to linearly translate the barrier 135 clear from the flow channel outlets 125 outside of a maintenance operation (e.g., during normal operation). In some embodiments, during a maintenance operation, the controller is configured to linearly translate the barrier 135 to obstruct each of the microfluidic channels in succession until the maintenance operation has been executed on each of the microfluidic channels. In such operations, in a first stage, a first portion of the microfluidic channels are obstructed and a second portion of the microfluidic channels are unobstructed for a period of time such that the fluid flow through the unobstructed channels is increased for that period of time. In a second stage, the controller 156 translates the barrier 135 such that the first portion of the microfluidic channels are unobstructed and the second portion of the microfluidic channels are obstructed for a period of time such that the fluid flow through the unobstructed channels is increased for that period of time. Additional maintenance stages are possible where the barrier 135 is further translated to obstruct additional groups of the plurality of microfluidic channels.

As with the discussion of the plurality of valves 129 and the maintenance system generally, the controller 156 can be configured to automatically selectively engage and disengage the barrier 135 of the maintenance system upon detecting that the flow characteristic received from the flow characteristic sensor 150, 162 is outside of a threshold. In such embodiments, upon detecting that the flow characteristic is outside the threshold, the controller 156 can selectively engage the barrier to linearly translate the barrier to undergo the maintenance operation, described in the paragraph above. The controller can disengage each of the plurality of valves 129 when the maintenance operation is complete, at which point the system 10 can proceed with normal operation until again the controller 156 detecting the flow characteristic is outside of the threshold. In other examples the controller 156 can be configured to automatically selectively engage and disengage the plurality of valves 129 of the barrier 135 of the maintenance system on a regular, periodic basis.

It is noted that, in some embodiments the barrier 135 can instead be configured to be slidably disposed in the second outlet flow path 116 instead of, or in addition to, the first outlet flow path 114. In such an example the barrier 135 disposed in the second outlet flow path 116 can be configured to be engaged to selectively obstruct at least a portion of the second channel outlets 125. In some such embodiments the barrier 135 is configured to leave at least one second channel outlet 125 unobstructed while other second channel outlets 125 are obstructed. In yet other embodiments the barrier 135 is configured to obstruct all of the second channel outlets 125 simultaneously.

The system of FIG. 3 can have additional or alternate maintenance system components, such as those shown and described above with reference to FIG. 2.

Additionally, while not visible in FIG. 2, such a system can incorporate maintenance system components described above with reference to FIG. 3.

Figure 4:
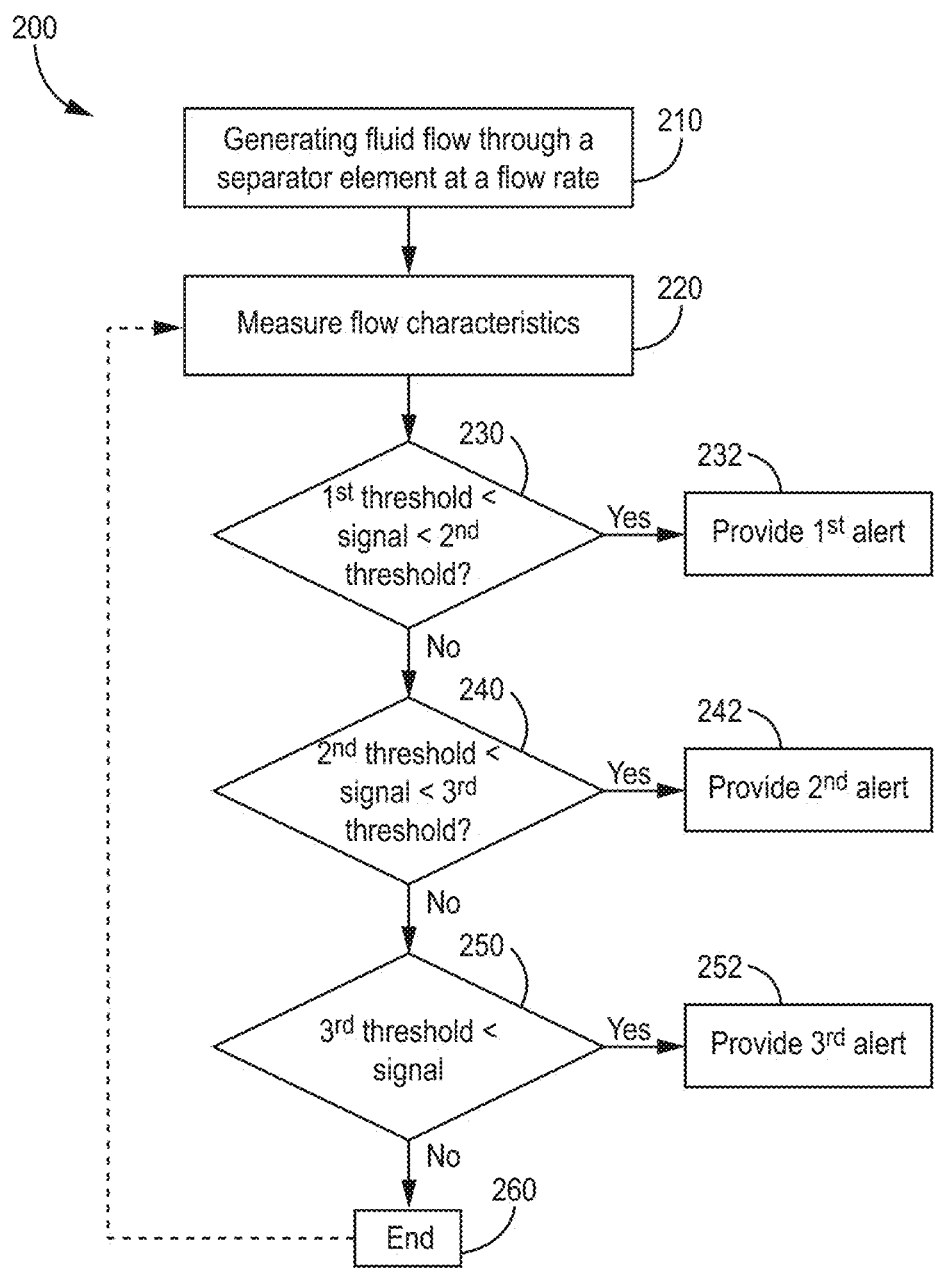
FIG. 4 is an example method consistent with some embodiments.

FIG. 4 is a flow chart consistent with some example methods. Fluid flow is generated through a separator element at a flow rate 210. The separator element generally has a plurality of microfluidic channels arranged in parallel. Fluid flow can be generated consistently with the discussions above with reference to FIG. 2. For example, a pump can generate the fluid flow through the element inlet and the element outlet or, as another example, a pressure-driven flow control flows the fluid through the element inlet and element outlet. Generally, fluid flow is generated through the hydrodynamic separator element at a constant flow rate. Fluid flow is generated through the plurality of parallel microfluidic channels. In some embodiments, the flow rate of the fluid flowing through the separator element is measured by a flow meter. Such data can be used to maintain a constant flow rate through the separator element.

A flow characteristic is measured 220. The flow characteristic can be consistent with example flow characteristics described above. In some embodiments, the flow characteristic is differential pressure. The differential pressure is generally measured 220 between the element inlet and the element outlet, as has been described in detail above. In some embodiments the differential pressure is measured at a low particle concentrate branch of the element outlet. In some embodiments the differential pressure is measured at a high particle concentrate branch of the element outlet. The pressure differential can provide an indication of the number of microfluidic channels that are blocked. Other types of flow characteristics can also be measured, however.

If the signal exceeds a first threshold and is less than a second threshold 230 a first alert is provided 232. The second threshold may be greater than the first threshold. The first alert can indicate that the hydrodynamic separator element is trending towards a state where it may no longer be effective for particle separation. For example, the first alert may indicate that the hydrodynamic separator element has a first particular predicted operational timeframe before it may no longer be effective for particle separation. In some examples, the first alert may indicate that the hydrodynamic separator element is no longer effective for particle separation. In some examples, the first alert indicates that the hydrodynamic separator element is trending towards a state where it may no longer be effective for particle separation. In some embodiments, if the signal does not exceed the first threshold 230, the process may end.

In embodiments consistent with that depicted, however, if the signal is not less than the second threshold 230, a determination is made as to whether the signal exceeds the second threshold and is less than a third threshold 240. The third threshold may be greater than the second threshold. If the signal exceeds the second threshold and is less than the third threshold 240, a second alert is provided 242. The second alert may indicate that the hydrodynamic separator element has a second particular predicted operational timeframe before it may no longer be effective. The second particular predicted operational timeframe may be shorter than the first particular predicted operational timeframe discussed in the paragraph above. In some other embodiments, the second alert may indicate that the hydrodynamic separator element is no longer effectively separating particles. In some embodiments, if the signal does not exceed the second threshold 240, the process may end.

However, in the current example, if the signal is not less than the third threshold 240, a determination is made as to whether the signal exceeds the third threshold 250. If the signal exceeds the third threshold 250, a third alert is provided 252. The third alert may indicate, for example, that the hydrodynamic separator element is no longer effectively separating particles. If the signal does not exceed the third threshold 250, the process ends 260 until the differential pressure is again measured 220. The process may repeat at selected intervals.

In various embodiments, one or more of the alerts is communicated to a user interface by a controller, where example user interfaces have been described above. Each alert may be communicated to a user through a different user interface or the same user interface. In some embodiments, an alert may provide a user with specific information such as the amount of time before a maintenance operation should be performed. In some embodiments, as alert may provide a user with general information such as that a maintenance operation should be performed.

In some embodiments, the number of microfluidic channels that are blocked are calculated by the controller. Such calculations can be consistent with the discussions above with reference to FIG. 2. In some such embodiments, the number of blocked channels can be communicated to a user by the controller through an alert, such as the alerts discussed above.

In some embodiments, the controller calculates the rate of channels becoming blocked (the "channel blockage rate") based on the period of time that the hydrodynamic separator has been operating and the number of channels that have become blocked during that operational time period. In some such embodiments, the controller can further calculate the predicted remaining operational time before recommended maintenance, such as when the number of channels blocked reaches a threshold number of blocked channels based on the calculated channel blockage rate. The threshold number of blocked channels can be the number of blocked channels at which the hydrodynamic separator has reduced effectiveness for particle separation, such as when the Dean Number is predicted to be 20, 21, 22, 23, 24 or 25. In some embodiments a notification of the number of blocked channels is communicated through a user interface.

Alternatively (or additionally), the controller can be configured to calculate the change in pressure differential over the operational time period to predict the remaining operational time before recommended maintenance, such as when the pressure differential reaches a pressure differential threshold at which the Dean Number is predicted to be 20, 21, 22, 23, 24 or 25. Alternatively, or additionally, the controller can be configured to calculate the change in average fluid velocity over the operational time period to predict the remaining operational time before recommended maintenance, such as when the average fluid velocity reaches an average fluid velocity threshold at which the Dean Number is predicted to be 20, 21, 22, 23, 24 or 25.

In embodiments, one or more alerts, such as the alerts described above, can include a notification of the predicted remaining operational time and that a maintenance operation is recommended before the remaining operational time expires. The notification can be provided through a user interface, for example.

Figure 5:
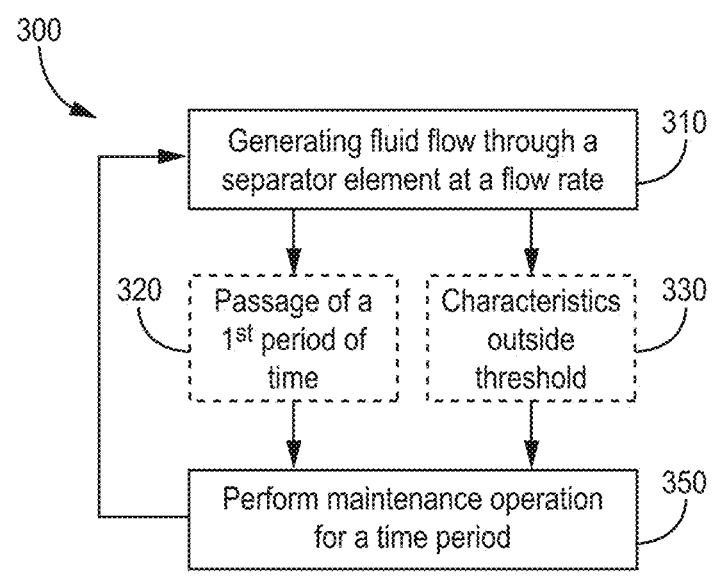
FIG. 5 is an example method consistent with some embodiments.

FIG. 5 is a flow chart depicting yet another method consistent with some embodiments. Fluid flow is generated through a separator element at a flow rate 310 and a maintenance operation is performed 350. The fluid flow is generated 310 from an element inlet to an element outlet of a hydrodynamic separator element at a constant flow rate for a first period of time. The fluid flow can be generated 310 with a flow generator as has been discussed in detail above. The separator element can have a plurality of microfluidic channels that are arranged in parallel, as has been discussed in detail above.

Performing a maintenance operation 350 generally includes modifying the fluid flow through the separator element. In various embodiments, a controller can modify the fluid flow. The fluid flow can be modified for a second period of time. In some embodiments, the first period of time is longer than the second period of time. Various approaches to modifying the fluid flow can be used. For example, a valve in selective obstructive communication with the element outlet can be engaged to obstruct at least a portion of the element outlet. In some embodiments, fluid flow rate through the separator element is modified. In some embodiments, the fluid flow rate is modified by reversing the fluid flow direction from the element outlet to the element inlet. In some embodiments, the fluid flow rate is modified by pulsing the fluid through the hydrodynamic separator element. In some embodiments, modifying the fluid flow includes stopping flow of the original microfluidic channel fluid (the first fluid) and flowing a second fluid through the plurality of microfluidic channels. The second fluid can be a cleaning fluid, for example. Various approaches for performing maintenance operations have been discussed in detail, above.

In some embodiments, performing the maintenance operation 350 occurs on a regular, periodic basis where the system is operated for a first period of time 310 and after the passage of the first period of time during which the maintenance operation is performed 350. More particularly, in some embodiments, modifying the fluid flow occurs on a regular, periodic basis. In some embodiments, the regular, periodic basis is at least once every 48 hours. In some embodiments, the regular, periodic basis is at least one every 24 hours.

Alternatively, or additionally, the maintenance operation is performed 350 upon sensing a flow characteristic by a flow characteristic sensor that is outside of a threshold 330. The flow characteristic can be sensed by a flow characteristic sensor, which has been described in detail above. The flow characteristic sensor is generally in sensing communication with the plurality of microfluidic channels. In some embodiments, a controller receives the flow characteristic and engages the maintenance system to perform the maintenance operation 350 when the flow characteristic is outside the threshold. The controller engages the maintenance system to modify the fluid flow through the separator element. In some embodiments, the fluid flow is modified alternately among the microfluidic channels in a plurality of stages, discussed above with reference to FIG. 3. In some other embodiments, the fluid flow is modified among the microfluidic channels in a single stage. After performance of the maintenance operation 350, fluid flow through the separator element at the constant flow rate is resumed 310.

EXEMPLARY EMBODIMENTS

Embodiment 1. A system comprising:
a hydrodynamic separation element defining an element inlet and an element outlet having a first element outlet branch and a second element outlet branch, the hydrodynamic separation element comprising a plurality of curved microfluidic channels in fluid communication, the plurality of microfluidic channels arranged to operate in parallel, wherein each microfluidic channel defines a channel inlet downstream of the element inlet and a channel outlet having a first channel outlet branch upstream of the first element outlet branch and a second channel outlet branch upstream of the second element outlet branch;
a pressure sensor in sensing communication with the element inlet and the element outlet, wherein the pressure sensor is configured to sense a pressure differential between the element inlet and the element outlet; and
a controller in data communication with the pressure sensor, wherein the controller is configured to provide a first alert upon the pressure differential exceeding a first threshold.

Embodiment 2. The system of any one of embodiments 1 and 3-9, a pump in fluid communication with the element inlet and element outlet.

Embodiment 3. The system of any one of embodiments 1-2 and 4-9, wherein the pump is configured to pump fluid through the element inlet at a constant flow rate.

Embodiment 4. The system of any one of embodiments 1-3 and 5-9, wherein the controller is configured to calculate a number of microfluidic channels that are blocked and communicate the number of blocked channels to a user.

Embodiment 5. The system of any one of embodiments 1-4 and 6-9, further comprising a flow meter in fluid communication with the element inlet.

Embodiment 6. The system of any one of embodiments 1-5 and 7-9, wherein the pressure sensor is configured to sense the pressure differential between the element inlet and a low particle concentrate branch of the element outlet.

Embodiment 7. The system of any one of embodiments 1-6 and 8-9, wherein the pressure sensor is configured to sense the pressure differential between the element inlet and a high particle concentrate branch of the element outlet.

Embodiment 8. The system of any one of embodiments 1-7 and 9, further comprising a pressure-driven flow control in fluid communication with the element inlet.

Embodiment 9. The system of any one of embodiments 1-8, wherein the wherein the controller is configured to provide a first alert upon the pressure differential exceeding a first threshold.

Embodiment 10. A method comprising:
flowing a fluid through an element inlet and an element outlet of a hydrodynamic separation element at a constant flow rate, wherein the separation element comprises a plurality of microfluidic channels arranged in parallel;
measuring a pressure differential between the element inlet and the element outlet; and
providing a first alert upon the pressure differential exceeding a first threshold.

Embodiment 11. The method of any one of embodiments 10 and 12-20, further comprising calculating a number of microfluidic channels that are blocked and communicating the number of blocked channels through a user interface.

Embodiment 12. The method of any one of embodiments 10-11 and 13-20, further comprising measuring the flow rate of the flowing fluid with a flow meter.

Embodiment 13. The method of any one of embodiments 10-12 and 14-20, wherein flowing the fluid through the element inlet and element outlet comprises pumping the fluid with a pump.

Embodiment 14. The method of any one of embodiments 10-13 and 15-20, wherein a pressure-driven flow control flows the fluid through the element inlet and element outlet.

Embodiment 15. The method of any one of embodiments 10-14 and 16-20, wherein measuring the pressure differential comprises measuring the pressure at the element inlet and measuring the pressure at a low particle concentrate branch of the element outlet.

Embodiment 16. The method of any one of embodiments 10-15 and 17-20, wherein measuring the pressure differential comprises measuring the pressure at the element inlet and measuring the pressure at a high particle concentrate branch of the element outlet.

Embodiment 17. The method of any one of embodiments 10-16 and 18-20, further comprising providing a second alert upon the pressure differential exceeding a second threshold.

Embodiment 18. The method of any one of embodiments 10-17 and 19-20, further comprising providing a third alert upon the pressure differential exceeding a third threshold.

Embodiment 19. The method of any one of embodiments 10-18 and 20, wherein the first alert provides a notification of a predicted remaining operational time before recommended maintenance.

Embodiment 20. The method of any one of embodiments 10-19, further comprising calculating a channel blockage rate during an operational time period of the hydrodynamic separation element and calculating the predicted remaining operational time based on the channel blockage rate.

Embodiment 21. A system comprising:
a hydrodynamic separator element defining:
an element inlet and an element outlet having a first element outlet and a second element outlet, and
a plurality of curved microfluidic channels arranged to operate in parallel, wherein each microfluidic channel defines:
a channel inlet downstream of the element inlet, and
a channel outlet having:
a first channel outlet upstream of the first element outlet, and
a second channel outlet upstream of the second element outlet;
a flow characteristic sensor in sensing communication with the plurality of microfluidic channels, wherein the flow characteristic sensor is configured to sense a flow characteristic; and
a controller in data communication with the flow characteristic sensor, wherein the controller is configured to provide a first output upon the flow characteristic being outside of a first threshold.

Embodiment 22. The system of any one of embodiments 21 and 23-40, a flow generator in fluid communication with the element inlet and element outlet.

Embodiment 23. The system of any one of embodiments 21-22 and 24-40, wherein the flow generator is configured to generate fluid flow through the element inlet at a constant flow rate.

Embodiment 24. The system of any one of embodiments 21-23 and 25-40, wherein the controller is configured to calculate a number of microfluidic channels that are blocked and communicate the number of blocked channels to a user.

Embodiment 25. The system of any one of embodiments 21-24 and 26-40, further comprising a flow meter in fluid communication with the element inlet.

Embodiment 26. The system of any one of embodiments 21-25 and 27-40, wherein the flow characteristic sensor comprises a pressure sensor in sensing communication with the element inlet and the element outlet, wherein the flow characteristic is a pressure differential between the element inlet and the element outlet.

Embodiment 27. The system of any one of embodiments 21-26 and 28-40, wherein the pressure sensor is configured to sense the pressure differential between the element inlet and a low particle concentrate branch of the element outlet, wherein the low particle concentration branch of the element outlet is the second element outlet.

Embodiment 28. The system of any one of embodiments 21-27 and 29-40, wherein the pressure sensor is configured to sense the pressure differential between the element inlet and a high particle concentrate branch of the element outlet, wherein the high particle concentration branch of the element outlet is the first element outlet.

Embodiment 29. The system of any one of embodiments 21-28 and 30-40, wherein the flow characteristic sensor comprises a flow meter and the flow characteristic is flow rate.

Embodiment 30. The system of any one of embodiments 21-29 and 31-40, wherein the flow characteristic sensor comprises a particle sensor.

Embodiment 31. The system of claim any one of embodiments 21-30 and 32-40, wherein the flow characteristic sensor comprises at least one sensor in the group consisting of: an optical sensor and an electrical property sensor.

Embodiment 32. The system of any one of embodiments 21-31 and 33-40, wherein the flow characteristic is at least one characteristic in the group consisting of: turbidity, particle count, particle concentration, pH, resistance, conductance, capacitance, and a dielectric property.

Embodiment 33. The system of any one of embodiments 21-32 and 34-40, further comprising a pressure-driven flow control in fluid communication with the element inlet.

Embodiment 34. The system of any one of embodiments 21-33 and 35-40, wherein the first output comprises a first alert providing a user instruction to engage the valve to obstruct the second element outlet.

Embodiment 35. The system of any one of embodiments 21-34 and 36-40, wherein the controller is configured to provide a second alert upon the flow characteristic exceeding a second threshold.

Embodiment 36. The system of any one of embodiments 21-35 and 37-40, further comprising a valve in selective obstructive communication with the second element outlet.

Embodiment 37. The system of any one of embodiments 21-36 and 38-40, wherein the controller is in operative communication with the valve, and the first output results in engagement of the valve to obstruct the second element outlet.

Embodiment 38. The system of any one of embodiments 21-37 and 39-40, further comprising a first outlet flow path upstream of the first element outlet, wherein each first channel outlet extends to the first outlet flow path, and the system further comprises a barrier disposed in the first outlet flow path, wherein the barrier is configured to selectively obstruct a plurality of first channel outlets along the first outlet flow path.

Embodiment 39. The system of any one of embodiments 21-38 and 40, wherein the controller is in operative communication with the flow generator and, upon the flow characteristic being outside of the first threshold, the controller is configured to cause the flow generator to pulse fluid through the hydrodynamic separator element.

Embodiment 40. The system of any one of embodiments 21-39, wherein the controller is in operative communication with the flow generator and, upon the flow characteristic being outside of the first threshold, the controller is configured to cause the flow generator to temporarily reverse flow direction.

Embodiment 41. A method comprising:
flowing a fluid through an element inlet and an element outlet of a hydrodynamic separator element at a constant flow rate, wherein the separator element comprises a plurality of microfluidic channels arranged in parallel;
measuring a flow characteristic between the element inlet and the element outlet; and providing a first alert upon the flow characteristic being outside of a first threshold.

Embodiment 42. The method of any one of embodiments 41 and 43-51, further comprising calculating a number of microfluidic channels that are blocked and communicating the number of blocked channels through a user interface.

Embodiment 43. The method of any one of embodiments 41-42 and 44-51, wherein measuring the flow characteristic comprises measuring pressure at the element inlet and measuring pressure at the element outlet.

Embodiment 44. The method of any one of embodiments 41-43 and 45-51, wherein flowing the fluid through the element inlet and element outlet comprises pumping the fluid with a pump.

Embodiment 45. The method of any one of embodiments 41-44 and 46-51, wherein a pressure-driven flow control flows the fluid through the element inlet and element outlet.

Embodiment 46. The method of any one of embodiments 41-45 and 47-51, wherein measuring the flow characteristic comprises measuring pressure at the element inlet and measuring pressure at a low particle concentrate branch of the element outlet.

Embodiment 47. The method of any one of embodiments 41-46 and 48-51, wherein measuring the flow characteristic comprises measuring the pressure at the element inlet and measuring the pressure at a high particle concentrate branch of the element outlet.

Embodiment 48. The method of any one of embodiments 41-47 and 49-51, further comprising providing a second alert upon the pressure differential exceeding a second threshold.

Embodiment 49. The method of any one of embodiments 41-48 and 50-51, further comprising providing a third alert upon the pressure differential exceeding a third threshold.

Embodiment 50. The method of any one of embodiments 41-49 and 51, wherein the first alert provides a notification of a predicted remaining operational time before recommended maintenance.

Embodiment 51. The method of any one of embodiments 41-50, further comprising calculating a channel blockage rate during an operational time period of the hydrodynamic separator element and calculating the predicted remaining operational time based on the channel blockage rate.

Embodiment 52. A system comprising:
a hydrodynamic separator element defining:
an element inlet and an element outlet having a first element outlet and a second element outlet; and
a plurality of curved microfluidic channels arranged to operate in parallel, wherein each microfluidic channel defines:
a channel inlet downstream of the element inlet, and
a channel outlet having a first channel outlet upstream of the first element outlet and a second channel outlet upstream of the second element outlet; and
an obstruction in selective obstructive communication with one or more of the microfluidic channels.

Embodiment 53. The system of any one of embodiments 52 and 54-70, further comprising a first outlet flow path upstream of the first element outlet, wherein each first channel outlet extends to the first outlet flow path, and the obstruction comprises a barrier disposed in the first outlet flow path, wherein the barrier is configured to selectively obstruct at least a portion of the plurality of first channel outlets along the first outlet flow path.

Embodiment 54. The system of any one of embodiments 52-53 and 55-70, wherein the barrier is configured to selectively obstruct a portion of the plurality of first channel outlets while leaving at least one first channel outlet unobstructed.

Embodiment 55. The system of any one of embodiments 52-54 and 56-70, wherein the barrier is configured to selectively obstruct all of the plurality of first channel outlets simultaneously.

Embodiment 56. The system of any one of embodiments 52-55 and 57-70, wherein the barrier is a mechanical component slidably disposed in the first outlet flow path, and the barrier has a length greater than the distance between two consecutive channel outlets along the first outlet flow path, whereby the barrier is configured to obstruct at least two consecutive first channel outlets.

Embodiment 57. The system of any one of embodiments 52-56 and 58-70, wherein the barrier has a length greater than the distance across at least 10 consecutive first channel outlets along the first outlet flow path.

Embodiment 58. The system of any one of embodiments 52-57 and 59-70, wherein the barrier comprises a plurality of valves each in selective obstructive communication a corresponding microfluidic channel.

Embodiment 59. The system of any one of embodiments 52-58 and 60-70, further comprising a flow characteristic sensor in sensing communication with the element inlet and the element outlet, wherein the flow characteristic sensor is configured to sense a flow characteristic being outside of a first threshold.

Embodiment 60. The system of any one of embodiments 52-59 and 61-70, wherein the flow characteristic sensor is a pressure sensor.

Embodiment 61. The system of any one of embodiments 52-60 and 62-70, wherein the flow characteristic sensor is a flow meter.

Embodiment 62. The system of any one of embodiments 52-61 and 63-70, wherein the flow characteristic sensor comprises a particle sensor.

Embodiment 63. The system of any one of embodiments 52-62 and 64-70, wherein the flow characteristic sensor comprises at least one sensor in the group consisting of: an optical sensor and an electrical property sensor.

Embodiment 64. The system of any one of embodiments 52-63 and 65-70, wherein the flow characteristic is at least one characteristic in the group consisting of: turbidity, particle count, particle concentration, pH, resistance, conductance, capacitance, and a dielectric property.

Embodiment 65. The system of any one of embodiments 52-64 and 66-70, further comprising a controller in data communication with the flow characteristic sensor, wherein the controller is configured to provide a first output upon the flow characteristic being outside of a first threshold.

Embodiment 66. The system of any one of embodiments 52-65 and 67-70, wherein the first output is an alert.

Embodiment 67. The system of any one of embodiments 52-66 and 68-70, wherein the controller is configured to provide a second alert upon the flow characteristic exceeding a second threshold.

Embodiment 68. The system of any one of embodiments 52-67 and 69-70, wherein the controller is configured to engage the obstruction.

Embodiment 69. The system of any one of embodiments 52-68 and 70, wherein the obstruction comprises a valve in selective obstructive communication with the second element outlet.

Embodiment 70. The system of any one of embodiments 52-69, wherein the obstruction comprises a valve in selective obstructive communication with the first element outlet.

Embodiment 71. A system comprising:
a hydrodynamic separator element defining:
an element inlet,
an element outlet having a first element outlet and a second element outlet,
a second outlet flow path upstream of the second element outlet, and
a plurality of curved microfluidic channels arranged to operate in parallel, wherein each microfluidic channel defines:
a channel inlet downstream of the element inlet, and a channel outlet having a first channel outlet upstream of the first element outlet and a second channel outlet upstream of the second outlet flow path;
a first flow generator in fluid communication with the plurality of microfluidic channels, wherein the first flow generator is configured to generate fluid flow at a first flow rate from the element inlet to the element outlet;
a maintenance system in fluid communication with the hydrodynamic separator element, wherein the maintenance system is configured to modify the fluid flow through the separator element; and
a controller in operative communication with the maintenance system, wherein the controller is configured to selectively engage and disengage the maintenance system.

Embodiment 72. The system of any one of embodiments 71 and 73-91, the maintenance system comprising a valve in selective obstructive communication with the second element outlet, wherein the controller is in operative communication with the valve.

Embodiment 73. The system of any one of embodiments 71-72 and 74-91, wherein the maintenance system comprises the first flow generator and the controller is configured to modify the fluid flow rate via the first flow generator.

Embodiment 74. The system of any one of embodiments 71-73 and 75-91, wherein the controller is configured to reverse the fluid flow via the first flow generator.

Embodiment 75. The system of any one of embodiments 71-74 and 76-91, wherein the controller is configured to pulse the fluid through the hydrodynamic separator element via the first flow generator.

Embodiment 76. The system of any one of embodiments 71-75 and 77-91, wherein the maintenance system comprises a second flow generator in fluid communication with the plurality of microfluidic channels, and wherein the controller is in operative communication with the first flow generator and the second flow generator, and the controller is configured to switch between operating the first flow generator and operating the second flow generator.

Embodiment 77. The system of any one of embodiments 71-76 and 78-91, wherein the controller is configured to engage the maintenance system on a regular, periodic basis.

Embodiment 78. The system of any one of embodiments 71-77 and 79-91, wherein the regular, periodic basis is at least once every 48 hours.

Embodiment 79. The system of any one of embodiments 71-78 and 80-91, further comprising a flow characteristic sensor in sensing communication with the plurality of microfluidic channels, wherein the flow characteristic sensor is in data communication with the controller and is configured to sense a flow characteristic, and the flow controller is configured to receive the flow characteristic and engage the maintenance system when the flow characteristic is outside of a threshold.

Embodiment 80. The system of any one of embodiments 71-79 and 81-91, wherein the flow characteristic sensor comprises a pressure sensor in sensing communication with the element inlet and the element outlet, wherein the flow characteristic is the pressure differential between the element inlet and the element outlet.

Embodiment 81. The system of any one of embodiments 71-80 and 82-91, wherein the pressure sensor is configured to sense the pressure differential between the element inlet and a low particle concentrate branch of the element outlet, wherein the low particle concentration branch of the element outlet is the second element outlet.

Embodiment 82. The system of any one of embodiments 71-81 and 83-91, wherein the pressure sensor is configured to sense the pressure differential between the element inlet and a high particle concentrate branch of the element outlet, wherein the high particle concentration branch of the element outlet is the first element outlet.

Embodiment 83. The system of any one of embodiments 71-82 and 84-91, wherein the flow characteristic sensor comprises a flow meter and the flow characteristic is flow rate.

Embodiment 84. The system of any one of embodiments 71-83 and 85-91, wherein the flow characteristic sensor comprises a particle sensor.

Embodiment 85. The system of any one of embodiments 71-84 and 86-91, wherein the flow characteristic sensor comprises at least one sensor in the group consisting of: an optical sensor and an electrical property sensor.

Embodiment 86. The system of any one of embodiments 71-85 and 87-91, wherein the flow characteristic is at least one characteristic in the group consisting of: turbidity, particle count, particle concentration, pH, resistance, conductance, capacitance, and a dielectric property.

Embodiment 87. The system of any one of embodiments 71-86 and 88-91, further comprising a pressure-driven flow control in fluid communication with the element inlet.

Embodiment 88. The system of any one of embodiments 71-87 and 89-91, wherein the maintenance system is in alternating fluid communication with individual microfluidic channels, and the controller is configured to selectively switch the maintenance system among the individual microfluidic channels.

Embodiment 89. The system of any one of embodiments 71-88 and 90-91, further comprising a first outlet flow path upstream of the first element outlet, wherein each first channel outlet extends to the first outlet flow path, and the maintenance system comprises a barrier disposed in the first outlet flow path, wherein the barrier is configured to selectively obstruct a plurality of first channel outlets along the first outlet flow path.

Embodiment 90. The system of any one of embodiments 71-89 and 91, wherein the controller is in operative communication with the flow generator and, upon the flow characteristic being outside of the first threshold, the controller is configured to cause the flow generator to pulse fluid through the hydrodynamic separator element.

Embodiment 91. The system of any one of embodiments 71-90, wherein the controller is in operative communication with the flow generator and, upon the flow characteristic being outside of the first threshold, the controller is configured to cause the flow generator to temporarily reverse flow direction.

Embodiment 92. A method comprising:
generating fluid flow from an element inlet to an element outlet of a hydrodynamic separator element at a constant flow rate for a first period of time, wherein the separator element comprises a plurality of microfluidic channels arranged in parallel; and
performing a maintenance operation comprising modifying the fluid flow through the separator element by a controller for a second period of time, wherein the first period of time is longer than the second period of time.

Embodiment 93. The method of any one of embodiments 92 and 94-101, wherein modifying the fluid flow comprises engaging a valve in selective obstructive communication with the element outlet.

Embodiment 94. The method of any one of embodiments 92-93 and 95-101, wherein modifying the fluid flow comprises modifying the fluid flow rate through the separator element.

Embodiment 95. The method of any one of embodiments 92-94 and 96-101, wherein modifying the fluid flow rate comprises reversing the fluid flow direction from the element outlet to the element inlet.

Embodiment 96. The method of any one of embodiments 92-95 and 97-101, wherein modifying the fluid flow comprises pulsing the fluid through the hydrodynamic separator element.

Embodiment 97. The method of any one of embodiments 92-96 and 98-101, wherein the fluid is a first fluid and modifying the fluid flow comprises stopping flow of the first fluid and flowing a second fluid through the plurality of microfluidic channels.

Embodiment 98. The method of any one of embodiments 92-97 and 99-101, wherein modifying the fluid flow occurs on a regular, periodic basis.

Embodiment 99. The method of any one of embodiments 92-98 and 100-101, wherein the regular, periodic basis is at least once every 48 hours.

Embodiment 100. The method of any one of embodiments 92-99 and 101, further comprising:
sensing a flow characteristic by a flow characteristic sensor that is in sensing communication with the hydrodynamic separator element; and sending the flow characteristic to the controller, wherein modifying the fluid flow through the separator element is executed when the flow characteristic is outside of a threshold.

Embodiment 101. The method of any one of embodiments 92-100, wherein modifying the fluid flow alternates among microfluidic channels.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A system comprising:
a hydrodynamic separator element defining:
an element inlet,
an element outlet having a first element outlet and a second element outlet,
a second outlet flow path upstream of the second element outlet, and
a plurality of curved microfluidic channels arranged to operate in parallel, wherein each microfluidic channel defines:
a channel inlet downstream of the element inlet, and
a channel outlet having a first channel outlet upstream of the first element outlet and a second channel outlet upstream of the second outlet flow path;
a first flow generator in fluid communication with the plurality of microfluidic channels, wherein the first flow generator is configured to generate fluid flow at a first flow rate from the element inlet to the element outlet;
a maintenance system in fluid communication with the hydrodynamic separator element, wherein the maintenance system is configured to modify the fluid flow through the separator element by: (i) pulsing the fluid flow through the hydrodynamic separator element, (ii) reversing the fluid flow direction from the element outlet to the element inlet, or (iii) obstructing the fluid flow through at least a portion of a channel;
a first outlet flow path upstream of the first element outlet, wherein each first channel outlet extends to the first outlet flow path, and the maintenance system comprises a barrier disposed in the first outlet flow path, wherein the barrier is a mechanical component slidably disposed in the first outlet flow path, and the barrier has a length greater than the distance between two consecutive channel outlets along the first outlet flow path, whereby the barrier is configured to obstruct at least two consecutive first channel outlets; and
a controller in operative communication with the maintenance system, wherein the controller is configured to selectively engage and disengage the maintenance system to modify the fluid flow.

2. The system of claim 1, the maintenance system comprising a valve in selective obstructive communication with the second element outlet, wherein the controller is in operative communication with the valve.

3. The system of claim 1, wherein the maintenance system comprises the first flow generator and the controller is configured to modify the fluid flow rate via the first flow generator.

4. The system of claim 1, wherein the maintenance system comprises a second flow generator in fluid communication with the plurality of microfluidic channels, and wherein the controller is in operative communication with the first flow generator and the second flow generator, and the controller is configured to switch between operating the first flow generator and operating the second flow generator.

5. The system of claim 1, wherein the controller is configured to engage the maintenance system on a regular, periodic basis.

6. The system of claim 1, further comprising a flow characteristic sensor in sensing communication with the plurality of microfluidic channels, wherein the flow characteristic sensor is in data communication with the controller and is configured to sense a flow characteristic, and the flow controller is configured to receive the flow characteristic and engage the maintenance system when the flow characteristic is outside of a threshold.

7. The system of claim 6, wherein the flow characteristic sensor comprises a pressure sensor in sensing communication with the element inlet and the element outlet, wherein the flow characteristic is the pressure differential between the element inlet and the element outlet.

8. The system of claim 6, wherein the flow characteristic is at least one characteristic in the group consisting of: turbidity, particle count, particle concentration, pH, resistance, conductance, capacitance, and a dielectric property.

9. A method comprising:
generating fluid flow from an element inlet to an element outlet of a hydrodynamic separator element at a constant flow rate for a first period of time, the element outlet having a first element outlet and a second element outlet downstream of a second outlet flow path, wherein the separator element comprises:
a plurality of curved microfluidic channels arranged to operate in parallel, wherein each microfluidic channel defines:
a channel inlet downstream of the element inlet, and
a channel outlet having a first channel outlet upstream of the first element outlet and a second channel outlet upstream of the second outlet flow path;
an obstruction in selective obstructive communication with one or more of the microfluidic channels;
a first outlet flow path upstream of the first element outlet, wherein each first channel outlet extends to the first outlet flow path, and the obstruction comprises a barrier that is a mechanical component slidably disposed in the first outlet flow path, wherein the barrier has a length greater than the distance between two consecutive channel outlets along the first outlet flow path, wherein the barrier is configured to selectively obstruct at least two first channel outlets along the first outlet flow path while leaving at least one first channel outlet unobstructed;
a first flow generator in fluid communication with the plurality of microfluidic channels, wherein the first flow generator is configured to generate fluid flow at a first flow rate from the element inlet to the element outlet;
a maintenance system in fluid communication with the hydrodynamic separator element; and
a controller in operative communication with the maintenance system, wherein the controller is configured to selectively engage and disengage the maintenance system to modify the fluid flow; and
performing a maintenance operation comprising modifying the fluid flow through the separator element by the controller for a second period of time, wherein the first period of time is longer than the second period of time, wherein modifying the fluid flow comprises (i) pulsing the fluid flow through the hydrodynamic separator element, (ii) reversing the fluid flow direction from the element outlet to the element inlet, or (iii) obstructing the fluid flow through at least a portion of a channel.

10. The method of claim 9, wherein modifying the fluid flow comprises engaging a valve in selective obstructive communication with the element outlet.

11. The method of claim 9, wherein modifying the fluid flow comprises modifying the fluid flow rate through the separator element.

12. The method of claim 9, wherein modifying the fluid flow rate comprises reversing the fluid flow.

13. The method of claim 9, wherein modifying the fluid flow occurs on a regular, periodic basis.

14. The method of claim 9, further comprising:
sensing a flow characteristic by a flow characteristic sensor that is in sensing communication with the hydrodynamic separator element; and
sending the flow characteristic to the controller, wherein modifying the fluid flow through the separator element is executed when the flow characteristic is outside of a threshold.

15. A system comprising:
a hydrodynamic separator element defining:
an element inlet and an element outlet having a first element outlet and a second element outlet; and
a plurality of curved microfluidic channels arranged to operate in parallel, wherein each microfluidic channel defines:
a channel inlet downstream of the element inlet, and
a channel outlet having a first channel outlet upstream of the first element outlet and a second channel outlet upstream of the second element outlet;
an obstruction in selective obstructive communication with one or more of the microfluidic channels; and
a first outlet flow path upstream of the first element outlet, wherein each first channel outlet extends to the first outlet flow path, and the obstruction comprises a barrier that is a mechanical component slidably disposed in the first outlet flow path, wherein the barrier has a length greater than the distance between two consecutive channel outlets along the first outlet flow path, wherein the barrier is configured to selectively obstruct at least two consecutive first channel outlets along the first outlet flow path while leaving at least one first channel outlet unobstructed.

16. The system of claim 15, wherein the barrier comprises a plurality of valves each in selective obstructive communication with a corresponding microfluidic channel.

17. The system of claim 15, wherein the obstruction comprises a valve in selective obstructive communication with the second element outlet.

* * * * *